United States Patent
Lee et al.

(10) Patent No.: US 9,094,059 B2
(45) Date of Patent: Jul. 28, 2015

(54) ESTABLISHING DATA COMMUNICATION CONNECTION USING WIRELESS POWER TRANSMISSION

(75) Inventors: Jaesung Lee, Gangwon-Do (KR); Jeong Kyo Seo, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 848 days.

(21) Appl. No.: 13/250,212

(22) Filed: Sep. 30, 2011

(65) Prior Publication Data

US 2012/0299389 A1    Nov. 29, 2012

(30) Foreign Application Priority Data

May 27, 2011    (KR) .................. 10-2011-0050920

(51) Int. Cl.
  *H01F 27/42*    (2006.01)
  *H04B 5/00*    (2006.01)
  *H04L 25/49*    (2006.01)
  *H02J 17/00*    (2006.01)

(52) U.S. Cl.
  CPC ............ *H04B 5/0075* (2013.01); *H04B 5/0031* (2013.01); *H04B 5/0037* (2013.01); *H04B 5/0087* (2013.01); *H04L 25/491* (2013.01); *H02J 17/00* (2013.01)

(58) Field of Classification Search
  CPC .............................. H04B 5/0025; H02J 17/00
  USPC ........................................................ 307/104
  See application file for complete search history.

(56) References Cited

U.S. PATENT DOCUMENTS

| 2011/0043327 A1* | 2/2011 | Baarman et al. ............... 340/5.8 |
| 2011/0156640 A1* | 6/2011 | Moshfeghi ..................... 320/108 |
| 2012/0245649 A1* | 9/2012 | Bohori et al. ..................... 607/9 |

OTHER PUBLICATIONS

"System Description Wireless Power Transfer", vol. 1: Low Power, Part 1: Interface Definition, Version 1.0, Wireless Power Consortium (Jul. 2010).

* cited by examiner

*Primary Examiner* — Daniel Cavallari
(74) *Attorney, Agent, or Firm* — Birch, Stewart, Kolasch & Birch, LLP

(57) ABSTRACT

A power transmitter according to an embodiment disclosed herein can include a power conversion unit configured to form a wireless power signal using power supplied from a power supply unit and receive a modulated wireless power signal containing a packet; a communication unit configured to transmit and receive user data via connection to a power receiver; and a control unit configured to detect the power receiver using the wireless power signal, decode a connection configuration packet transmitted from the power receiver based on the modulated wireless power signal, and establish the connection to the power receiver based on access information included in the connection configuration packet.

23 Claims, 18 Drawing Sheets

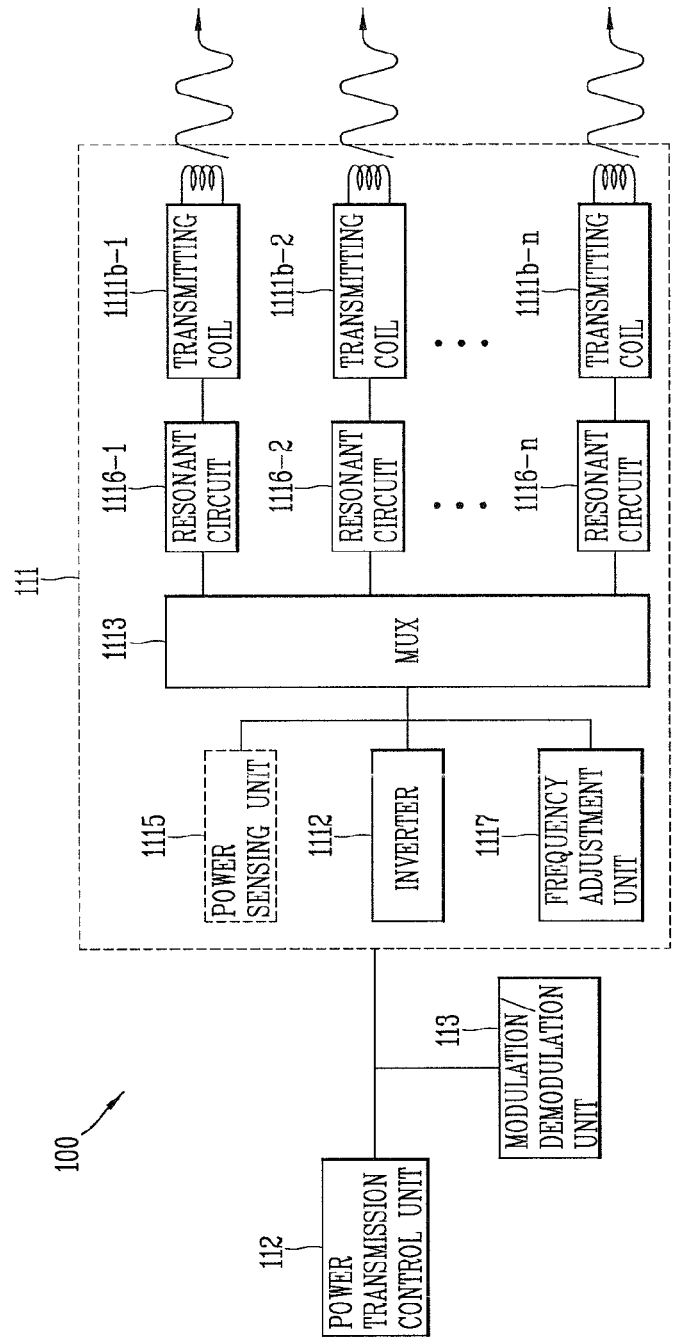

FIG. 16A

| | b7 | b6 | b5 | b4 | b3 | b2 | b1 | b0 | |
|---|---|---|---|---|---|---|---|---|---|
| B0 | HEADER(5220) | | | | | | | | 5200 |
| B1 | MAJOR VERSION (5231) | | | | MINOR VERSION (5232) | | | | |
| B2 | MANUFACTURER CODE(5233) | | | | | | | | |
| B3 | | | | | | | | | |
| B4 | EXT (5234) | | | | | | | | 5230 |
| ⋮ | BASIC DEVICE IDENTIFIER(5235) | | | | | | | | |
| B7 | | | | | | | | | |

FIG. 16B

| | b7 | b6 | b5 | b4 | b3 | b2 | b1 | b0 | |
|---|---|---|---|---|---|---|---|---|---|
| B0 | HEADER(5320) | | | | | | | | 5300 |
| B1 | EXTENDED DEVICE IDENTIFIER(5330) | | | | | | | | |
| ⋮ | | | | | | | | | |
| B8 | | | | | | | | | |

ESTABLISHING DATA COMMUNICATION CONNECTION USING WIRELESS POWER TRANSMISSION

This application claims the benefit of Korean Patent Application No. 10-2011-0050920, filed on May 27, 2011, which is hereby incorporated by reference for all purposes as if fully set forth herein.

BACKGROUND OF THE INVENTION

1. Field of the Invention

The present disclosure relates to a wireless power transfer.

2. Description of the Related Art

Electrical energy has been supplied to electronic devices through wires conventionally; however a method of wireless power transfer is recently adopted instead. The electronic device can be operating directly by the electrical energy transferred in a wireless manner, or by the electrical power from the battery charged using the power transferred wirelessly.

SUMMARY OF THE INVENTION

In accordance with the embodiments disclosed herein, there is provided a scheme for establishing connection for data communication using contactless power transfer between a power transmitter and a power receiver in a wireless manner. For this purpose, in accordance with the embodiments disclosed herein, there is provided a scheme for transmitting and receiving information used for data communication using a power signal for transmitting power in a wireless manner.

In an embodiment, there is disclosed a power transmitter. The power transmitter can include a power conversion unit configured to form a wireless power signal using power supplied from a power supply unit and receive a modulated wireless power signal containing a packet; a communication unit configured to transmit and receive user data via connection to a power receiver; and a control unit configured to detect the power receiver using the wireless power signal, decode a connection configuration packet transmitted from the power receiver based on the modulated wireless power signal, and establish the connection to the power receiver based on access information included in the connection configuration packet.

The foregoing embodiment and other embodiments can include any one of the following features.

The control unit can determine whether or not the connection to the power receiver is established, and decode the connection configuration packet, and acquire the access information from the decoded connection configuration packet when the connection is not established as a result of the determination.

The control unit can determine whether or not the connection to the power receiver is established, and request the access information to the power receiver when the connection is not established as a result of the determination. The access information can be requested through the wireless power signal.

The access information can be information for authenticating or authorizing data communication.

The control unit can detect the power receiver by measuring a change of the power supplied to form the wireless power signal and determining whether or not the power receiver exists based on the measured change amount of the power.

The control unit can detect the power receiver by forming a detection signal through the power conversion unit and receiving a packet in response to the detection signal. Furthermore, the detection signal can be a wireless power signal formed by applying a power signal at a specific operating point. Furthermore, a packet received in response to the detection signal can include a message indicating a strength of the detection signal received by the power receiver.

The control unit can determine whether or not the communication unit is activated subsequent to detecting the power receiver, and activate the communication unit when the communication unit is not activated.

The power transmitter can further include a display unit, such that the control unit displays information on whether or not the power receiver has been detected, a connection state of the communication unit, a data transmitting and receiving state of the communication unit, or power transferred to the power receiver on the display unit. Furthermore, the information on power can include a rectified power amount, a power transfer speed, a power transfer efficiency, a power transfer time, a charge progress rate, a charged power amount or power transfer state in the power receiver. Furthermore, the information on power transferred to the power receiver can be received via connection to the power receiver by the communication unit.

On the other hand, a power receiver will be disclosed as another embodiment. The power receiver can include a power receiving unit configured to receive a wireless power signal and modulate the wireless power signal to include a packet therein; a communication unit configured to transmit and receive user data via connection to a power transmitter; and a control unit configured to generate a connection configuration packet including access information for connecting to the power transmitter, transmit the connection configuration packet to the power transmitter through the power signal modulated by the power receiving unit, and establish the connection to the power transmitter based on the access information.

The foregoing embodiment and other embodiments can include any one of the following features.

The control unit can determine whether or not the connection to the power transmitter is established, and transmit the connection configuration packet to the power transmitter through the modulated wireless power signal when the connection is not established as a result of the determination.

The control unit can transmit the connection configuration packet to the power transmitter through the modulated wireless power signal when the access information is requested from the power transmitter. Furthermore, the access information can be requested through the wireless power signal.

The access information can be information for authenticating or authorizing data communication.

The communication unit can perform communication in a Bluetooth method, and the access information can be a password or address. Furthermore, the control unit can establish connection for data communication by performing device pairing with the power transmitter based on the Bluetooth address.

The communication unit can perform communication in a wireless LAN method, and the access information can be a password, a key or an address used to access the wireless LAN. Furthermore, the control unit can establish connection for data communication by performing authentication with the power transmitter based on the access information.

The control unit can transmit the packet in response to a wireless power signal for detection through the modulated wireless power signal to the power transmitter when receiving the wireless power signal for detection by the power receiver. Furthermore, a packet transmitted in response to the wireless power signal for detection can include a message indicating a strength of the wireless power signal for detection received by the power receiver.

The control unit can determine whether or not the communication unit is activated subsequent to receiving the wireless power signal by the power receiver, and activate the communication unit when the communication unit is not activated.

The power receiver can further include a charger configured to charge a battery based on the received wireless power signal.

The power receiver can further include a display unit, such that the control unit displays information on a receiving state of the wireless power signal, a connection state of the communication unit, a data transmitting and receiving state of the communication unit, or power received by the power receiver on the display unit. Furthermore, the information on the received power can include a rectified power amount, a power transfer speed, a power transfer efficiency, a power transfer time, a charge progress rate, a charged power amount or a power transfer state by the power receiving unit.

According to a power transmission method disclosed herein, an electronic device can transmit access information used to establish connection for data communication to a wireless power transmitter. The electronic device can transmit and receive user data including information on power transmission via connection to the wireless power transmitter. Furthermore, the electronic device can provide a data communication channel to the wireless power transmitter via the established connection, and receive power from the wireless power transmitter in compensation for that.

On the other hand, according to a power transmission method disclosed herein, a wireless power transmitter can receive information used to establish connection for data communication through a separate channel. Furthermore, the wireless power transmitter can acquire a channel capable of transmitting and receiving user data by supplying power to the electronic device and establishing connection for data communication with the electronic device. Furthermore, the wireless power transmitter can display information associated with power transmission via the established connection with the electronic device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a block diagram illustrating a wireless power transmitter configured to have one or more transmission coils receiving power according to a resonance coupling method that can be employed in the embodiments disclosed herein;

FIGS. 15 through 20 are views illustrating the structure of packets including a power control message between the wireless power transmitter 100 and electronic device 200;

DETAILED DESCRIPTION OF THE INVENTION

Figure 1:
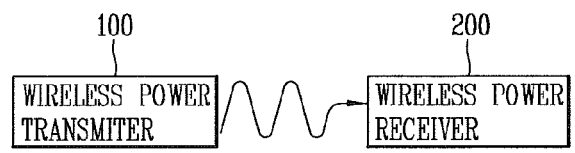
FIG. 1 is a view conceptually illustrating a wireless power transmitter and an electronic device according to the embodiments of the present invention.

The technologies disclosed herein can be applicable to wireless power transfer. However, the technologies disclosed herein are not limited to this, and can be also applicable to all kinds of power transmission systems and methods, wireless charging circuits and methods to which the technical idea of the disclosure can be applicable, in addition to the methods and apparatuses using power transmitted in a wireless manner.

It should be noted that technical terms used herein are merely used to describe a specific embodiment, but not to limit the present invention. Also, unless particularly defined otherwise, technical terms used herein should be construed as a meaning that is generally understood by those having ordinary skill in the art to which the invention pertains, and should not be construed too broadly or too narrowly. Furthermore, if technical terms used herein are wrong terms unable to correctly express the technical idea of the invention, then they should be replaced by technical terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element can be named to a second element, and similarly, a second element can be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the technical idea of the invention, and therefore, they should not be construed to limit the technical idea of the invention by the accompanying drawings.

Conceptual View of Wireless Power Transmitter and Electronic Device

FIG. 1 is a view conceptually illustrating a wireless power transmitter and an electronic device according to the embodiments of the present invention.

Referring to FIG. 1, the wireless power transmitter 100 can be a power transfer apparatus configured to transfer power used for the electronic device 200 in a wireless manner.

Furthermore, the wireless power transmitter 100 can be a wireless charging apparatus configured to charge a battery of the electronic device 200 by transferring power in a wireless manner. Some embodiments where the wireless power transmitter 100 is implemented as a wireless charging apparatus will be described later with reference to FIG. 9.

Additionally, the wireless power transmitter 100 can be implemented with various forms of apparatuses transferring power to the electronic device 200 which is in need of a contactless power source.

The electronic device 200 can be a device that is operable directly by the electrical power received from the wireless power transmitter 100 in a wireless manner. Furthermore, the electronic device 200 can charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, can be a mobile communication terminal, (for example, a mobile phone, a cellular phone, and a tablet or multimedia device). Some embodiments where the electronic device is implemented as a mobile terminal will be described later with reference to FIG. 10.

Meanwhile, the wireless power transmitter 100 can use one or more methods for wireless power transfer to transfer power to the electronic device 200 in a wireless manner without contact. In other words, the wireless power transmitter 100 can transfer power using at least one of an inductive coupling method based on magnetic induction by the wireless power signal and a magnetic resonance coupling method based on electromagnetic resonance via a wireless power signal of a specific frequency.

Wireless power transfer in the inductive coupling method is a technology transmitting power in a wireless manner using a primary coil and a secondary coil, and refers to the transmission of power by inducing a current from a coil to another coil through a changing magnetic field by magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

FIG. 2 is a block diagram illustrating the configuration of a wireless power transmitter 100 and an electronic device 200 that can be employed in the embodiments disclosed herein.

Figure 2A:
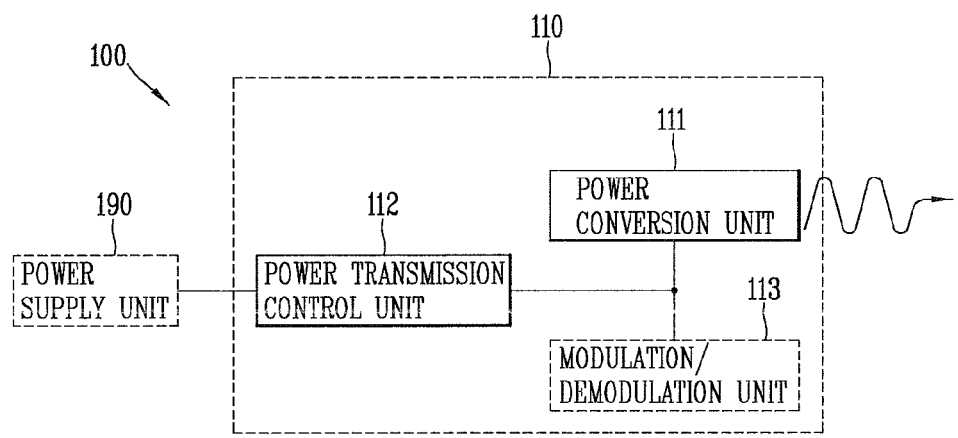
FIGS. 2A and 2B are block diagrams illustrating the configuration of a wireless power transmitter 100 and an electronic device 200 that can be employed in the embodiments disclosed herein, respectively.

FIG. 2A—Wireless Power Transmitter

Referring to FIG. 2A, the wireless power transmitter 100 can include a power transmission unit 110. The power transmission unit 110 can include a power conversion unit 111 and a power transmission control unit 112.

The power conversion unit 111 transfers power supplied from the transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 can be configured to include a coil for generating the wireless power signal.

The power conversion unit 111 can include a constituent element for generating a different type of wireless power signal according to each power transfer method. For example, the power conversion unit 111 can include a primary coil for forming a changing magnetic field to induce a current to a secondary coil of the electronic device 200. Furthermore, the power conversion unit 111 can include a coil (or antenna) for forming a magnetic field having a specific resonance frequency to generate a resonance frequency in the electronic device 200 according to the resonance coupling method.

Furthermore, the power conversion unit 111 can transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 can further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 can be implemented to be integrated into another control unit for controlling the wireless power transmitter 100.

On the other hand, a region to which the wireless power signal can be approached can be divided into two types. First, active area denotes a region through which a wireless power signal transferring power to the electronic device 200 is passed. Next, semi-active area denotes a region of interest in which the wireless power transmitter 100 can detect the existence of the electronic device 200. The semi-active area may also be called as semi-charging area, considering the case where the wireless power transmitter 100 is transferring a power to the electronic device 200 for charging. Here, the power transmission control unit 112 can detect whether the electronic device 200 is placed in the active area or semi-active area or removed from the area. Specifically, the power transmission control unit 112 can detect whether or not the electronic device 200 is placed in the active area or semi-active area using a wireless power signal formed from the power conversion unit 111 or a sensor separately provided therein. For instance, the power transmission control unit 112 can detect the presence of the electronic device 200 by monitoring whether or not the characteristic of power for forming the wireless power signal is changed by the wireless power signal, which is affected by the electronic device 200 existing in the semi-active area. However, the active area and semi-active area can vary according to the wireless power transfer method such as an inductive coupling method, a resonance coupling method, and the like. For example, the wireless power transmitter 100 can interact with the electronic device 200 placed in the semi-active area, performing various process such as an analog ping, a digital ping, and an identification/configuration process, which will be described in other part of this document.

The power transmission control unit 112 can perform the process of identifying the electronic device 200 or determine whether to start wireless power transfer according to a result of detecting the existence of the electronic device 200.

Furthermore, the power transmission control unit 112 can determine at least one characteristic of a frequency, a voltage, and a current of the power conversion unit 111 for forming the wireless power signal. The determination of the characteristic can be carried out by a condition at the side of the wireless power transmitter 100 or a condition at the side of the electronic device 200.

The power transmission control unit 112 can receive a power control message from the electronic device 200. The power transmission control unit 112 can determine at least one characteristic of a frequency, a voltage and a current of the power conversion unit 111 based on the received power control message, and additionally perform other control operations based on the power control message.

For example, the power transmission control unit 112 can determine at least one characteristic of a frequency, a voltage and a current used to form the wireless power signal according to the power control message including at least one of rectified power amount information, charging state information and identification information in the electronic device 200.

Furthermore, as another control operation using the power control message, the wireless power transmitter 100 can perform a typical control operation associated with wireless power transfer based on the power control message. For example, a signal detector can receive information associated with the electronic device 200 to be auditorily or visually output through the power control message, or receive information used for authentication between devices.

In order to receive the foregoing power control message, the power transmission control unit 112 can use at least one of a method for receiving it through the wireless power signal and a method for receiving other user data.

In order to receive the foregoing power control message, the wireless power transmitter 100 can further include a power communications modulation/demodulation unit 113 electrically connected to the power conversion unit 111. The power communications modulation/demodulation unit 113 can demodulate a wireless power signal that has been modulated by the electronic device 200 and use it to receive the power control message. The method for allowing the power conversion unit 111 to receive a power control message using a wireless power signal will be described later with reference to FIGS. 11 through 20.

In addition, the power transmission control unit 112 can acquire a power control message by receiving user data including a power control message by a communication means included in the wireless power transmitter 100.

Figure 2B:
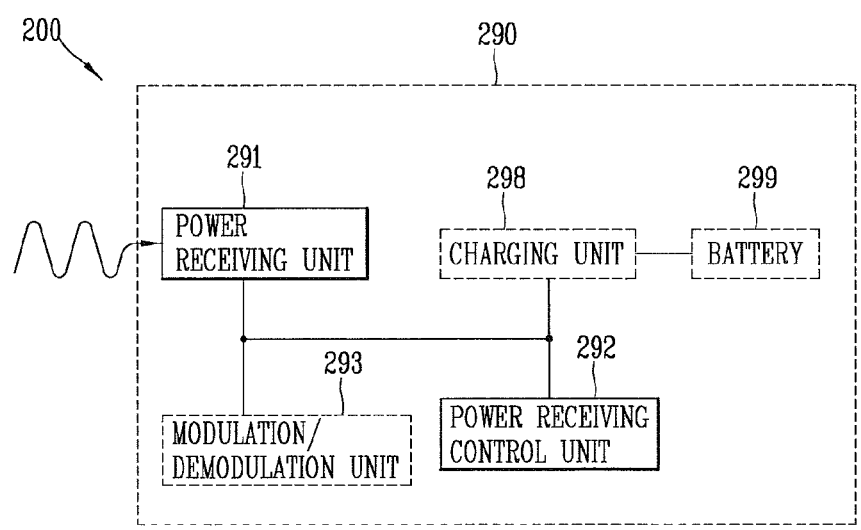

FIG. 2B—Electronic Device

Referring to FIG. 2B, the electronic device 200 can include a power supply unit 290. The power supply unit 290 supplies power used for the operation of the electronic device 200. The power supply unit 290 can include a power receiving unit 291 and a power receiving control unit 292. The power receiving unit 291 receives power transferred from the wireless power transmitter 100 in a wireless manner.

The power receiving unit 291 can include constituent elements used to receive the wireless power signal according to a wireless power transfer method. Furthermore, the power receiving unit 291 can receive power according to at least one wireless power transfer method, and the power receiving unit 291 can include constituent elements used for each method.

First, the power receiving unit 291 can include a coil for receiving a wireless power signal transferred in the form of a magnetic field or electromagnetic field having a vibration characteristic.

For instance, as a constituent element according to the inductive coupling method, the power receiving unit 291 can include a secondary coil to which a current is induced by a changing magnetic field. Furthermore, the power receiving unit 291, as a constituent element according to the resonance coupling method, can include a coil and a resonant circuit in which resonance phenomenon is generated by a magnetic field having a specific resonance frequency.

However, when the power receiving unit 291 receives power according to at least one wireless power transfer method, the power receiving unit 291 can be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 can further include a rectifier and a regulator to convert the wireless power signal into a direct current. Furthermore, the power receiving unit 291 can further include a circuit for protecting an overvoltage or overcurrent from being generated by the received power signal. The power receiving control unit 292 can control each constituent element included in the power supply unit 290.

Specifically, the power receiving control unit 292 can transfer a power control message to the wireless power transmitter 100. The power control message can instruct the wireless power transmitter 100 to initiate or terminate a transfer of the wireless power signal. Furthermore, the power control message can instruct the wireless power transmitter 100 to control a characteristic of the wireless power signal.

In order to transmit the foregoing power control message, the power receiving control unit 292 can use at least one of a method for transmitting it through the wireless power signal and a method for transmitting other user data.

In order to transmit the foregoing power control message, the electronic device 200 can further include a power communications modulation/demodulation unit 293 electrically connected to the power receiving unit 291. The power communications modulation/demodulation unit 293, like the wireless power transmitter 100, can be used to transmit the power control message through the wireless power signal. The power communications modulation/demodulation unit 293 can be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power receiving control unit 292 controls the power communications modulation/demodulation unit 293 at the side of the electronic device 200 to modulate the wireless power signal. For instance, the power receiving control unit 292 can perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 can detect a change of the current and/or voltage to perform a demodulation process.

In other words, the power receiving control unit 292 can generate a packet including a power control message intended to be transferred to the wireless power transmitter 100 and modulate the wireless power signal to allow the packet to be included therein, and the power transmission control unit 112 can decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 10 through 13.

In addition, the power receiving control unit 292 can transmit a power control message to the wireless power transmitter 100 by transmitting user data including the power control message by a communication means included in the electronic device 200.

In addition, the power supply unit 290 can further include a charger 298 and a battery 299.

The electronic device 200 receiving power for operation from the power supply unit 290 can be operated by power transferred from the wireless power transmitter 100, or operated by charging the battery 299 using the transferred power and then receiving the charged power. At this time, the power receiving control unit 292 can control to perform charging using the transferred power.

Hereinafter, a wireless power transmitter and an electronic device applicable to the embodiments disclosed herein will be described. First, a method of allowing the wireless power transmitter to transfer power to the electronic device according to the inductive coupling method will be described with reference to FIGS. 3 through 5.

Figure 3:
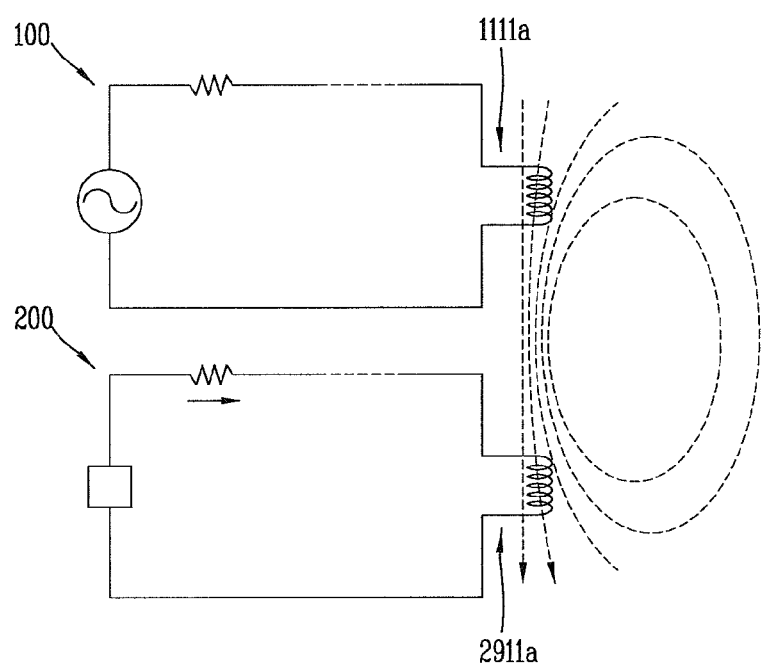
FIG. 3 is a view illustrating a concept in which power is transferred from a wireless power transmitter to an electronic device in a wireless manner according to an inductive coupling method according to an embodiment of the present invention.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 can include a transmitting (Tx) coil 1111a being operated as a primary coil in magnetic induction. Furthermore, the power receiving unit 291 of the electronic device 200 can include a receiving (Rx) coil 2911a being operated as a secondary coil in magnetic induction.

First, the wireless power transmitter 100 and electronic device 200 are disposed in such a manner that the transmitting coil 1111a at the side of the wireless power transmitter 100 and the receiving coil at the side of the electronic device 200 are located adjacent to each other. Then, if the power transmission control unit 112 controls a current of the transmitting coil 1111a to be changed, then the power receiving unit 291 controls power to be supplied to the electronic device 200 using an electromotive force induced to the receiving coil 2911a.

The efficiency of wireless power transfer by the inductive coupling method can be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 can be configured to include an interface surface in the form of a flat surface. One or more electronic devices can be placed at an upper portion of the interface surface, and the transmitting coil 1111a can be mounted at a lower portion of the interface surface. A vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement wireless power transfer by the inductive coupling method.

Furthermore, an alignment indicator indicating a location where the electronic device 200 is to be placed at an upper portion of the interface surface. The alignment indicator indicates a location of the electronic device 200 where an alignment between the transmitting coil 1111a mounted at a lower portion of the interface surface and the receiving coil 2911a can be suitably implemented. The alignment indicator can be simple marks, or can be formed in the form of a protrusion structure for guiding the location of the electronic device 200. Otherwise, the alignment indicator can be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 can be formed to include one or more transmitting coils. The wireless power transmitter 100 can selectively use some of coils suitably arranged with the receiving coil 2911a of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
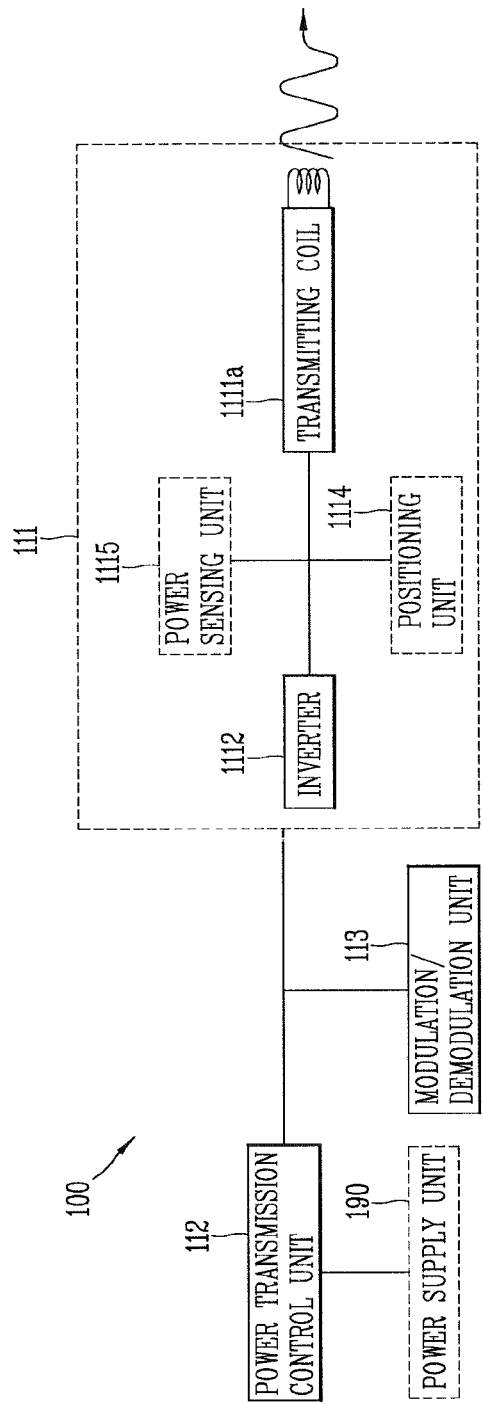
FIGS. 4A and 4B are block diagrams illustrating part of the wireless power transmitter 100 and electronic device 200 in a magnetic induction method that can be employed in the embodiments disclosed herein.
Figure 4B:
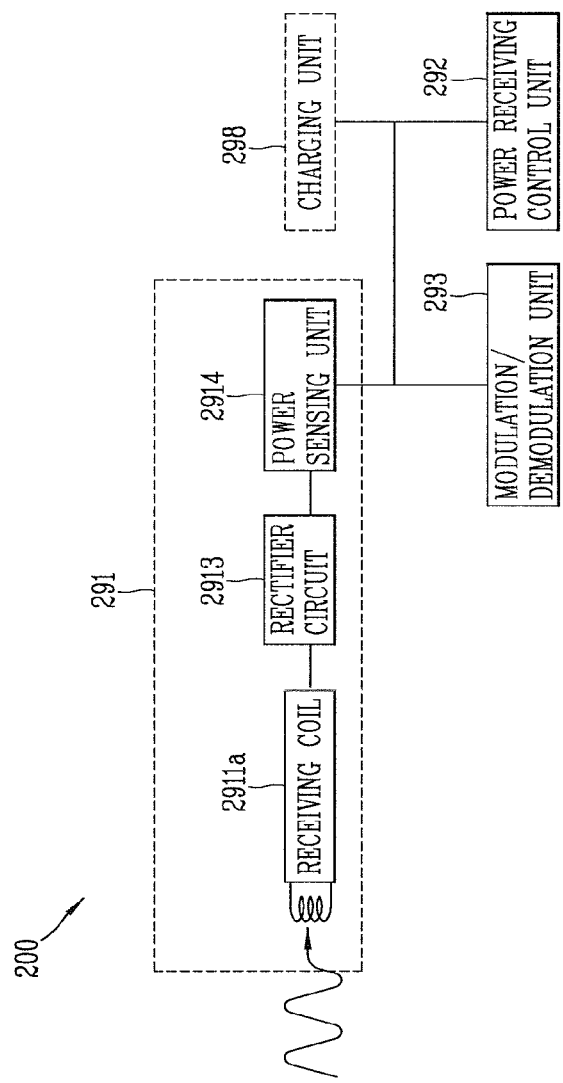

FIGS. 4A and 4B—Wireless Power Transmitter and Electronic Device in Inductive Coupling Method FIGS. 4A and 4B are block diagrams illustrating part of the wireless power transmitter 100 and electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 can include a transmitting (Tx) coil 1111a and an inverter 1112.

The transmitting coil 1111a can form a magnetic field corresponding to the wireless power signal according to a change of current as described above. The transmitting coil 1111a can be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor to form a magnetic field in the transmitting coil 1111a. In addition, the power conversion unit 111 can further include a positioning unit 1114.

The positioning unit 1114 can move or rotate the transmitting coil 1111a to enhance the effectiveness of wireless power transfer using the inductive coupling method. As described above, it is because an alignment and distance between the wireless power transmitter 100 and the electronic device 200 including a primary coil and a secondary coil can affect power transfer using the inductive coupling method. In particular, the positioning unit 1114 can be used when the electronic device 200 does not exist within an active area of the wireless power transmitter 100.

Accordingly, the positioning unit 1114 can include a drive unit for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 can further include a detection unit made of a sensor for detecting the location of the electronic device 200, and the power transmission control unit 112 can control the positioning unit 1114 based on the location information of the electronic device 200 received from the location detection sensor.

Furthermore, to this end, the power transmission control unit 112 can receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 can determine which one of the plurality of transmitting coils is to be used for power transfer. The configuration of the wireless power transmitter 100 including the plurality of transmitting coils will be described later with reference to FIG. 5.

On the other hand, the power conversion unit 111 can further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 can detect a voltage or current of the power supplied from the outside, and check whether the detected voltage or current exceeds a threshold value. The power sensing unit 1115 can include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 can control a switching unit to cut off power applied to the transmitting coil 1111a.

Referring to FIG. 4B, the power supply unit 290 of the electronic device 200 can include a receiving (Rx) coil 2911a and a rectifier circuit 2912.

A current is induced into the receiving coil 2911a by a change of the magnetic field formed in the transmitting coil 1111a. The implementation type of the receiving coil 2911a can be a planar spiral type or cylindrical solenoid type similarly to the transmitting coil 1111a.

Furthermore, series and parallel capacitors can be configured to be connected to the receiving coil 2911a to enhance the effectiveness of wireless power reception or perform resonant detection.

The receiving coil 2911a can be in the form of a single coil or a plurality of coils.

The rectifier circuit 2913 performs a full-wave rectification to a current to convert alternating current into direct current. The rectifier circuit 2913, for instance, can be implemented with a full-bridge rectifier circuit made of four diodes or a circuit using active components.

In addition, the rectifier circuit 2913 can further include a regulator circuit for converting a rectified current into a more flat and stable direct current. Furthermore, the output power of the rectifier circuit 2913 is supplied to each constituent element of the power supply unit 290. Furthermore, the rectifier circuit 2913 can further include a DC-DC converter for converting output DC power into a suitable voltage to adjust it to the power used for each constituent element (for instance, a circuit such as a charger 298).

The power communications modulation/demodulation unit 293 can be connected to the power receiving unit 291, and can be configured with a resistive element in which resistance varies with respect to direct current, and can be configured with a capacitive element in which reactance varies with respect to alternating current. The power receiving control unit 292 can change the resistance or reactance of the power communications modulation/demodulation unit 293 to modulate a wireless power signal received to the power receiving unit 291.

On the other hand, the power supply unit 290 can further include a power sensing unit 2914. The power sensing unit 2914 at the side of the electronic device 200 monitors a voltage and/or current of the power rectified by the rectifier circuit 2913, and if the voltage and/or current of the rectified power exceeds a threshold value as a result of monitoring, then the power receiving control unit 292 transmits a power control message to the wireless power transmitter 100 to transfer suitable power.

Figure 5:
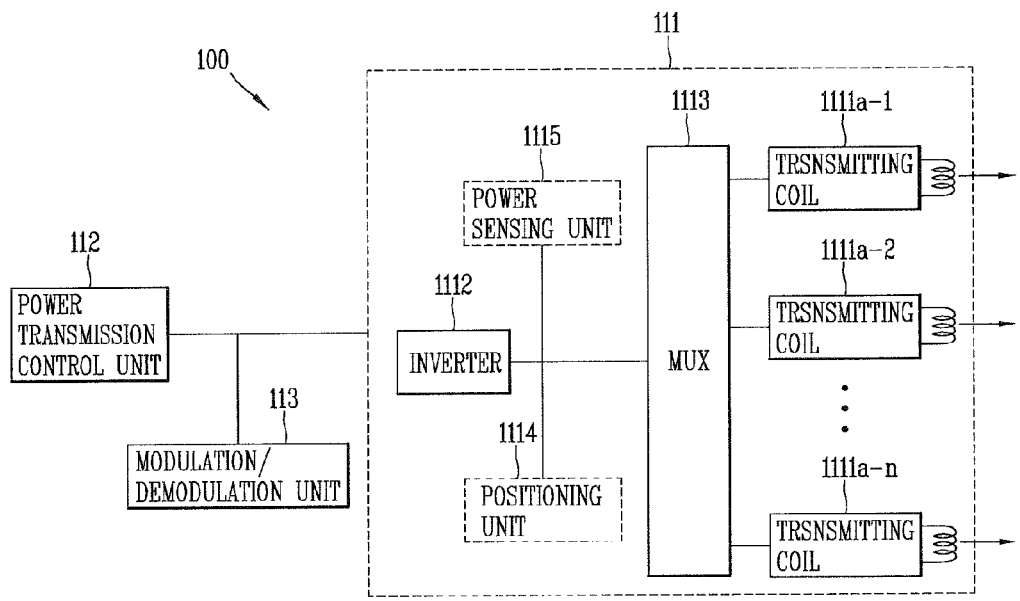
FIG. 5 is a block diagram illustrating a wireless power transmitter configured to have one or more transmission coils receiving power according to an inductive coupling method that can be employed in the embodiments disclosed herein.

FIG. 5—Wireless Power Transmitter Configured to Include One or More Transmitting Coils FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein can include one or more transmitting coils 1111a-1 to 1111a-n. The one or more transmitting coils 1111a-1 to 1111a-n can be an array of partly overlapping primary coils. An active area can be determined by some of the one or more transmitting coils.

The one or more transmitting coils 1111a-1 to 1111a-n can be mounted at a lower portion of the interface surface. Furthermore, the power conversion unit 111 can further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 can take the detected location of the electronic device 200 into consideration to control the multiplexer 1113, thereby allowing coils that can be placed in an inductive coupling relation to the receiving coil 2911a of the electronic device 200 among the one or more transmitting coils 1111a-1 to 1111a-n to be connected to one another.

For this purpose, the power transmission control unit 112 can acquire the location information of the electronic device 200. For example, the power transmission control unit 112 can acquire the location of the electronic device 200 on the interface surface by the location detection unit provided in the wireless power transmitter 100. For another example, the power transmission control unit 112 can receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface can denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area can be designated as a primary cell. Accordingly, the power transmission control unit 112 can determine an active area based on the detected location of the electronic device 200, and establish the connection of a primary cell corresponding to the active area to control the multiplexer 1113, thereby allowing the receiving coil 2911a of the electronic device 200 and the coils belonging to the primary cell to be placed in an inductive coupling relation.

Furthermore, the power conversion unit 111 can further include an impedance matching unit for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
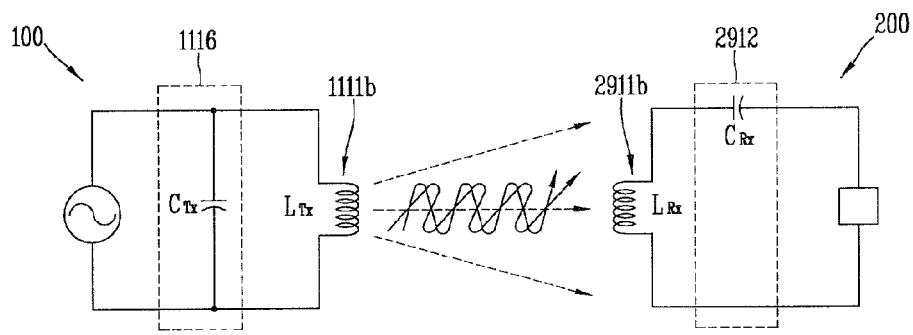
FIG. 6 is a view illustrating a concept in which power is transferred to an electronic device from a wireless power transmitter in a wireless manner according to a resonance coupling method according to an embodiment of the present invention.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device 200 by the formed magnetic field, then power is generated by the resonance phenomenon in the electronic device 200.

The resonance frequency can be determined by the following formula in Equation 1.

$$f = \frac{1}{2\pi\sqrt{LC}} \qquad \text{[Equation 1]}$$

Here, the resonance frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit can be configured to be connected thereto to determine the resonance frequency.

Referring to FIG. 6, when power is transmitted in a wireless manner according to the resonance coupling method, the power conversion unit 111 of the wireless power transmitter 100 can include a transmitting (Tx) coil 1111b in which a magnetic field is formed and a resonant circuit 1116 connected to the transmitting coil 1111b to determine a specific vibration frequency. The resonant circuit 1116 can be implemented by using a capacitive circuit (capacitors), and the specific vibration frequency can be determined based on an inductance of the transmitting coil 1111b and a capacitance of the resonant circuit 1116.

The configuration of a circuit element of the resonant circuit 1116 can be implemented in various forms such that the power conversion unit 111 forms a magnetic field, and is not limited to a form of being connected in parallel to the transmitting coil 1111b as illustrated in FIG. 6.

Furthermore, the power receiving unit 291 of the electronic device 200 can include a resonant circuit 2912 and a receiving (Rx) coil 2911b to generate a resonance phenomenon by a magnetic field formed in the wireless power transmitter 100. In other words, the resonant circuit 2912 can be also implemented by using a capacitive circuit, and the resonant circuit 2912 is configured such that a resonance frequency determined based on an inductance of the receiving coil 2911b and a capacitance of the resonant circuit 2912 has the same frequency as a resonance frequency of the formed magnetic field.

The configuration of a circuit element of the resonant circuit 2912 can be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 can have $L_{TX}$, $C_{TX}$, and can be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a wireless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of wireless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
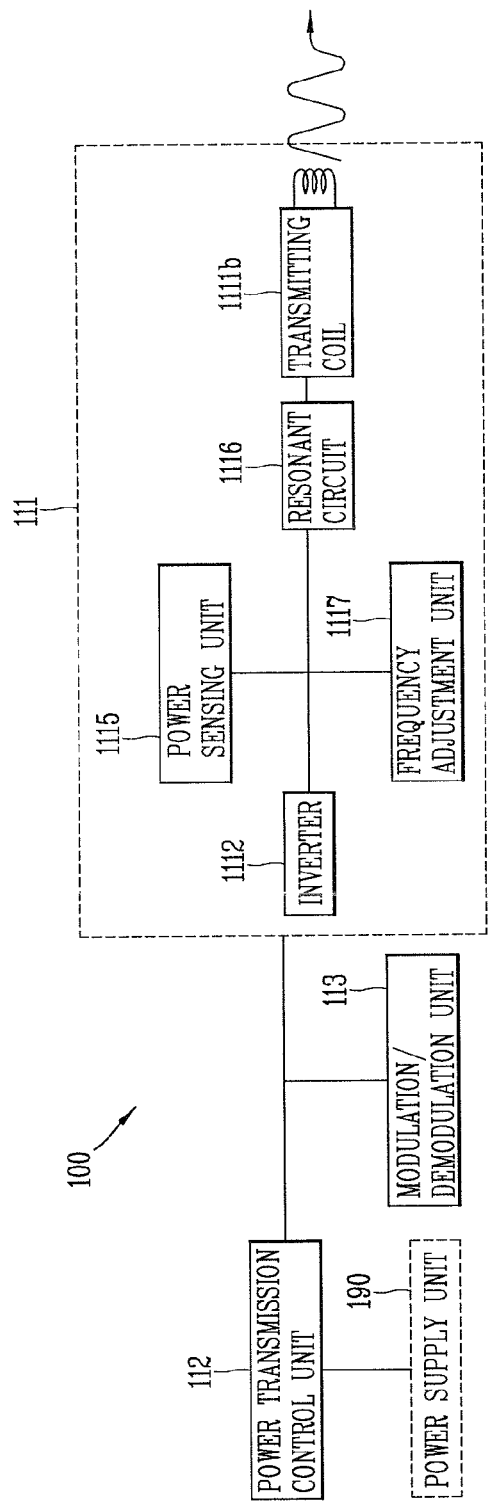
FIGS. 7A and 7B are block diagrams illustrating part of the wireless power transmitter 100 and electronic device 200 in a resonance method that can be employed in the embodiments disclosed herein.
Figure 7B:
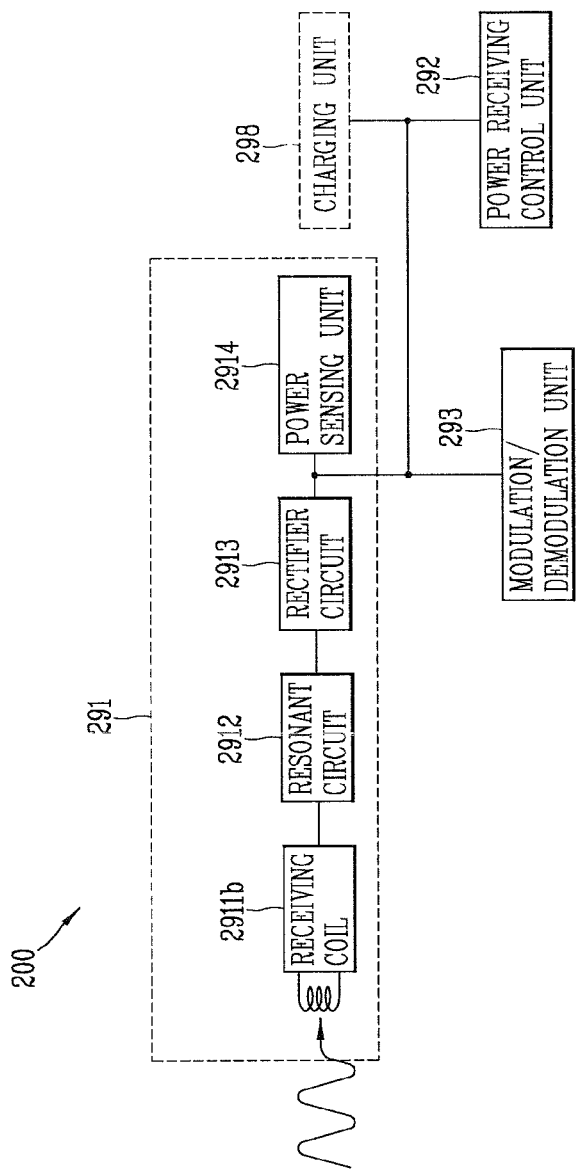

FIGS. 7A and 7B—Wireless Power Transmitter in Resonance Coupling Method

FIGS. 7A and 7B are block diagrams illustrating part of the wireless power transmitter 100 and electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 can include a transmitting (Tx) coil 1111b, an inverter 1112, and a resonant circuit 1116. The inverter 1112 can be configured to be connected to the transmitting coil 1111b and the resonant circuit 1116.

The transmitting coil 1111b can be mounted separately from the transmitting coil 1111a for transferring power according to the inductive coupling method, but can transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency can be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 can further include a frequency adjustment unit 1117 for changing a resonance frequency of the power conversion unit 111. The resonance frequency of the power conversion unit 111 is determined based on an inductance and/or capacitance within a circuit constituting the power conversion unit 111 by Equation 1, and thus the power transmission control unit 112 can determine the resonance frequency of the power conversion unit 111 by controlling the frequency adjustment unit 1117 to change the inductance and/or capacitance.

The frequency adjustment unit 1117, for example, can be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 can further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, can include the receiving (Rx) coil 2911b and resonant circuit 2912.

In addition, the power receiving unit 291 of the power supply unit 290 can further include a rectifier circuit 2913 for converting an AC current generated by resonance phenomenon into DC. The rectifier circuit 2913 can be configured similarly to the foregoing description.

Furthermore, the power receiving unit 291 can further include a power sensing unit 2914 for monitoring a voltage and/or current of the rectified power. The power sensing unit 2914 can be configured similarly to the foregoing description.

FIG. 8—Wireless Power Transmitter Configured to Include One or More Transmitting Coils FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein can include one or more transmitting coils 1111b-1 to 1111b-n and resonant circuits (1116-1 to 1116-n) connected to each transmitting coils. Furthermore, the power conversion unit 111 can further include a multiplexer 1113 for establishing and releasing the connection of some of the one or more transmitting coils 1111b-1 to 1111b-n.

The one or more transmitting coils 1111b-1 to 1111b-n can be configured to have the same vibration frequency, or some of them can be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 can be configured to change an inductance and/or capacitance of the resonant circuits (1116-1 to 1116-n) connected to the one or more transmitting coils 1111b-1 to 1111b-n, respectively.

Figure 9:
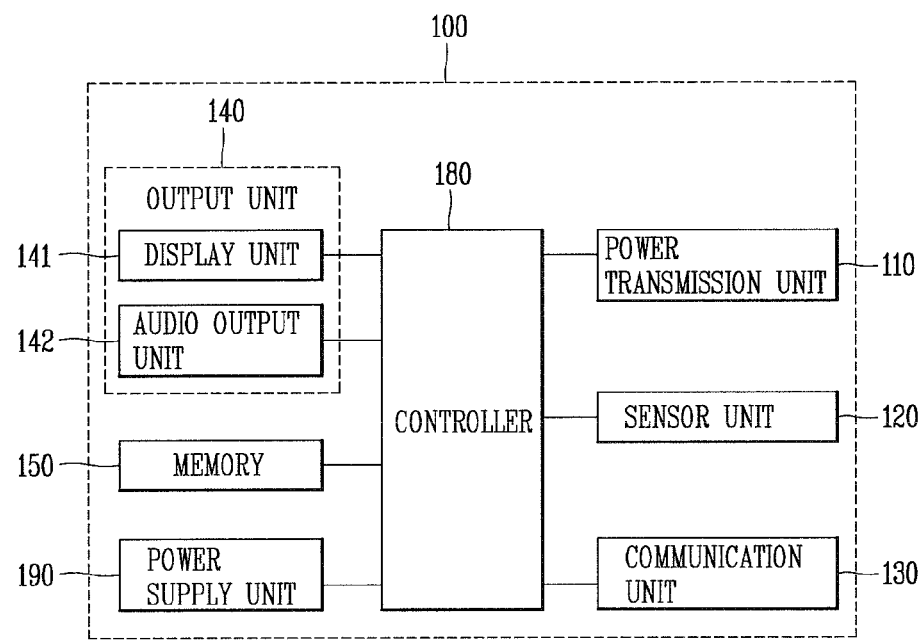
FIG. 9 is a block diagram illustrating a wireless power transmitter further including an additional element in addition to the configuration illustrated in FIG. 2A according to an embodiment of the present invention.

FIG. 9—Wireless Power Transmitter Implemented by Charger

On the other hand, hereinafter, an example of the wireless power transmitter implemented in the form of a wireless charger.

FIG. 9 is a block diagram illustrating a wireless power transmitter further including an additional element in addition to the configuration illustrated in FIG. 2A.

Referring to FIG. 9, the wireless power transmitter 100 can further include a sensor unit 120, a communication unit 130, an output unit 140, a memory 150, and a control unit 180 in addition to the power transmission unit 110 and power supply unit 190 for supporting at least one of the foregoing inductive coupling method and resonance coupling method.

The control unit 180 controls the power transmission unit 110, the sensor unit 120, the communication unit 130, the output unit 140, the memory 150, and the power supply unit 190.

The control unit 180 can be implemented by a module separated from the power transmission control unit 112 in the power transmission unit 110 described with reference to FIG. 2 or can be implemented by a single module.

The sensor unit 120 can include a sensor for detecting the location of the electronic device 200. The location information detected by the sensor unit 120 can be used for allowing the power transmission unit 110 to transfer power in an efficient manner.

For instance, during wireless power transfer according to the inductive coupling method, the sensor unit 120 can be operated as a detection unit, and the location information detected by the sensor unit 120 can be used to move or rotate the transmitting coil 1111a in the power transmission unit 110.

Furthermore, for example, the wireless power transmitter 100 configured to include the foregoing one or more transmitting coils can determine coils that can be placed in an inductive coupling relation or resonance coupling relation to the receiving coil of the electronic device 200 among the one or more transmitting coils based on the location information of the electronic device 200.

On the other hand, the sensor unit 120 can be configured to monitor whether or not the electronic device 200 approaches a chargeable region. The approach or non-approach detection function of the sensor unit 120 can be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 can include an electronic component for at least any one of Bluetooth™, Zigbee, Ultra Wide Band (UWB), Wireless USB, Near Field Communication (NFC), and Wireless LAN.

The communication unit 130 establishes connection to the electronic device 200 to perform data communication with the electronic device 200. The communication unit 130 can require access information to establish connection to the electronic device 200. The access information for establishing the connection can be information used for authentication or authorization. The access information can correspond to a physical (or hardware) address, a logical (or on a network) address, a password or a cryptographic key of the communication unit 130.

The control unit 180 can receive the access information used to establish connection to the electronic device 200 through a power control message included in a wireless power signal modulated by the electronic device 200. The control unit 180 can establish connection for data communication with the electronic device 200 based on the received access information.

For instance, when the communication unit 130 performs communication in a Bluetooth™ method, the access information can correspond to a Bluetooth™ address. The control unit 180 can acquire the Bluetooth™ address through a power control message and control the communication unit 130 to perform device pairing with the electronic device 200. Then, the control unit 180 can establish connection to transmit and receive user data with the electronic device 200.

For instance, when the communication unit 130 performs communication in a wireless LAN method, the access information can correspond to a service set identifier (SSID), wired equivalent privacy (WEP) or authentication information of Wi-Fi protected access (WPA), a device address, and the like. The control unit 180 can control the communication unit 130 to acquire the access information through a power control message and perform authentication or access to the electronic device 200. Then, the control unit 180 can establish connection to transmit and/or receive user data to and/or from the electronic device 200.

To this end, the control unit 180 can determine whether or not connection to the electronic device 200 is established, and request the electronic device 200 to transmit access information when the connection is not established and the access information is used to establish the connection as a result of the determination. The control unit 180 can request the electronic device 200 to transmit the access information through a wireless power signal. For instance, the control unit 180 can request the electronic device 200 to transmit the access information by controlling a specific frequency, amplitude, voltage or current to be applied to the power conversion unit 111 to form a wireless power signal. The electronic device 200 can transmit the access information by detecting a wireless power signal requesting the transmission of the access information and modulating the wireless power signal to include the access information.

On the other hand, the communication unit 130 can be in a standby state or disabled to reduce power. When the electronic device 200 is detected by using the power transmission unit 110, the control unit 180 can determine whether the communication unit 130 is activated. If the communication unit 130 is not activated as a result of the determination, then the control unit 180 can control to activate the communication unit 130.

The output unit 140 can include at least one of a display unit 141 and an audio output unit 142. The display unit 141 can include at least one of a liquid crystal display (LCD), a thin film transistor-liquid crystal display (TFT-LCD), an organic light-emitting diode (OLED), a flexible display, and a three-dimensional (3D) display. The display unit 141 can display a charging state under the control of the control unit 180.

The memory 150 can include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 can operate in association with a web storage performing the storage function of the memory 150 on the Internet.

A program or commands performing the foregoing functions of the wireless power transmitter 100 can be stored in the memory 150. The control unit 180 can perform the program or commands stored in the memory 150 to transmit power in a wireless manner. A memory controller can be used to allow other constituent elements (e.g., control unit 180) included in the wireless power transmitter 100 to access the memory 150.

However, it would be easily understood by those skilled in the art that the configuration of a wireless power transmitter according to the embodiment disclosed herein can be applicable to an apparatus, such as a docking station, a terminal cradle device, and an electronic device, and the like, excluding when it is applicable to only a wireless charger.

Figure 10:
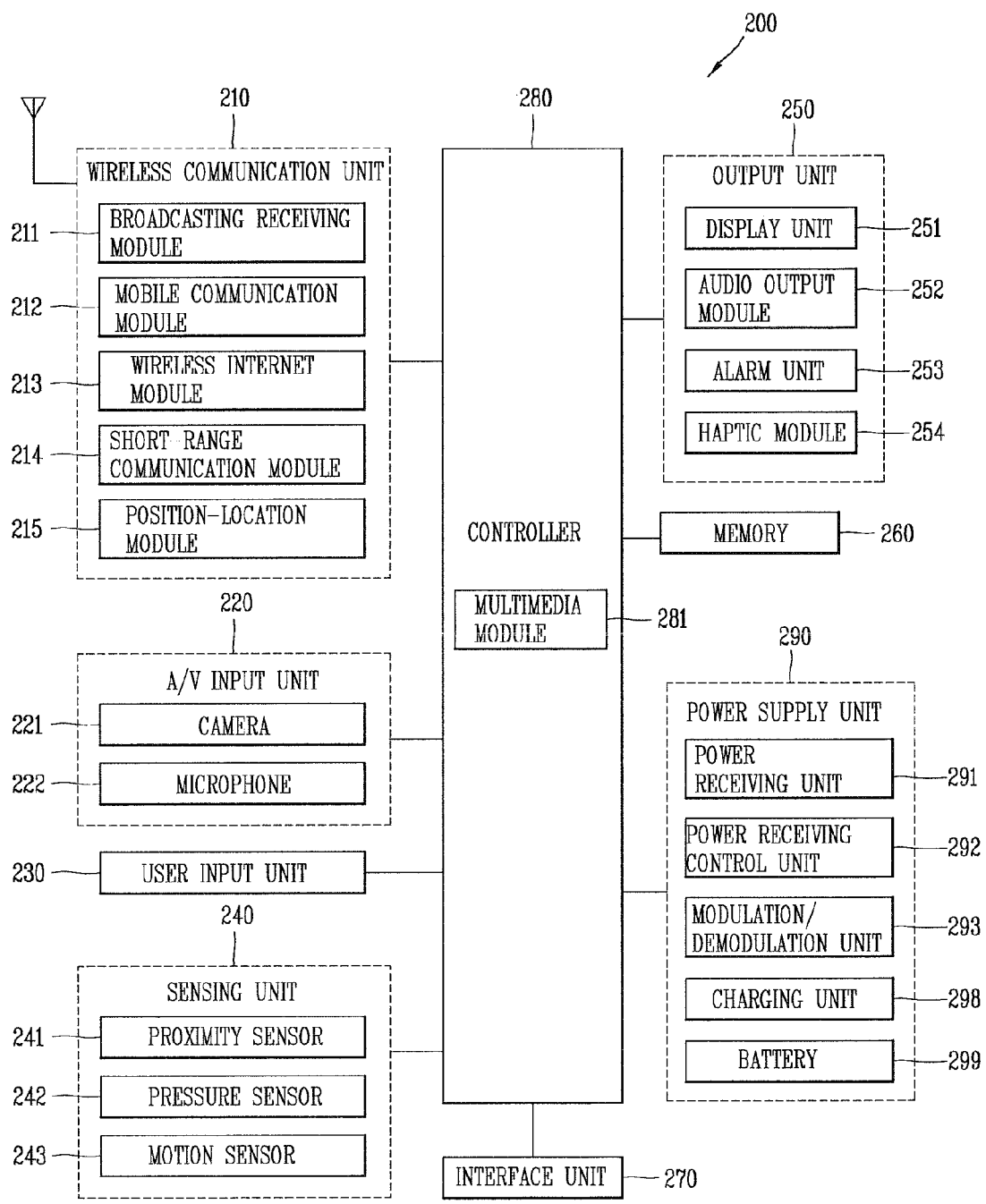
FIG. 10 is view illustrating a configuration in which an electronic device 200 according to the embodiments disclosed herein is implemented in the form of a mobile terminal.

FIG. 10—Wireless Power Receiver Implemented with Mobile Terminal

FIG. 10 is a view illustrating a configuration in which an electronic device 200 according to the embodiments disclosed herein is implemented in the form of a mobile terminal.

The mobile communication terminal 200 can include a power supply unit 290 illustrated in FIG. 2, 4, or 7.

Furthermore, the terminal 200 can further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components can alternatively be implemented.

Hereinafter, each component is described in sequence.

The wireless communication unit 210 can typically include one or more modules which permit wireless communications between the terminal 200 and a wireless communication system or between the terminal 200 and a network within which the terminal 200 is located. For example, the wireless communication unit 210 can include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel.

The broadcast channel can include a satellite channel and a terrestrial channel. The broadcast center can indicate a server which generates and transmits a broadcast signal and/or broadcast associated information or a server which receives a pre-generated broadcast signal and/or broadcast associated information and sends them to the portable terminal. The broadcast signal can be implemented as a TV broadcast signal, a radio broadcast signal, and a data broadcast signal, among others. The broadcast signal can further include a data broadcast signal combined with a TV or radio broadcast signal.

Examples of broadcast associated information can denote information associated with a broadcast channel, a broadcast program, a broadcast service provider, and the like. The broadcast associated information can be provided via a mobile communication network. It can be received by the mobile communication module 212.

The broadcast associated information can be implemented in various formats. For instance, broadcast associated information can include Electronic Program Guide (EPG) of Digital Multimedia Broadcasting (DMB), Electronic Service Guide (ESG) of Digital Video Broadcast-Handheld (DVB-H), and the like.

The broadcast receiving module 211 can be configured to receive digital broadcast signals transmitted from various types of broadcast systems. Such broadcast systems can include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 can be configured to be suitable for every broadcast system transmitting broadcast signals as well as the digital broadcasting systems.

Broadcast signals and/or broadcast associated information received via the broadcast receiving module 211 can be stored in a suitable device, such as a memory 260.

The mobile communication module 212 transmits/receives wireless signals to/from at least any one of a base station, an external portable terminal, and a server on a mobile communication network. The wireless signal can include audio call signal, video (telephony) call signal, or various formats of data according to transmission/reception of text/multimedia messages.

The wireless internet module 213 supports wireless Internet access for the portable terminal. This module can be internally or externally coupled to the terminal 100. Examples of such wireless Internet access can include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module can include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt of Intel technology, and the like, can be used for wired short-range communication.

The wireless internet module 213 or the short-range communication module 214 can establish data communication connection to the wireless power transmitter 100.

Through the established data communication, when there is an audio signal to be output while transferring power in a wireless manner, the wireless internet module 213 or the short-range communication module 214 can transmit the audio signal to the wireless power transmitter 100 through the short-range communication module. Furthermore, through the established data communication, when there is information to be displayed, the wireless internet module 213 or the short-range communication module 214 can transmit the information to the wireless power transmitter 100. Otherwise, the wireless internet module 213 or the short-range communication module 214 can transmit an audio signal received through a microphone integrated in the wireless power transmitter 100. Furthermore, the wireless internet module 213 or the short-range communication module 214 can transmit the identification information (e.g., phone number or device name of a portable phone) of the mobile terminal 200 to the wireless power transmitter 100 through the established data communication.

The position location module 215 is a module for acquiring a position of the terminal. An example of the position location module 215 can include a Global Position System (GPS) module.

Referring to FIG. 10, the A/V input unit 220 is configured to provide audio or video signal input to the portable terminal. The A/V input unit 220 can include a camera 221 and a microphone 222. The camera 221 processes image frames of still or moving images obtained by an image sensor in a video call mode or a capture more. The processed image frames can be displayed on the display unit 251.

The image frames processed by the camera 221 can be stored in the memory 260 or transmitted to the exterior via the wireless communication unit 210. Two or more cameras 221 can be provided therein according to the use environment.

The microphone 222 can receive an external audio signal by a microphone in a phone call mode, a recording mode, a voice recognition mode, or the like to process it into electrical audio data. The processed audio data is converted and output into a format transmittable to a mobile communication base station via the mobile communication module 212 when in the phone call mode. The microphone 222 can include various noise removal algorithms to remove noises generated while receiving the external audio signal.

The user input unit 230 can generate input data to allow the user to control the operation of the terminal. The user input unit 230 can include a keypad, a dome switch, a touchpad (e.g., static pressure/capacitance), a jog wheel, a jog switch and the like.

The sensing unit 240 can include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 can detect a proximity object using a change of the AC magnetic field or static magnetic field, a change rate of the electrostatic capacity, or the like. Two or more proximity sensors 241 can be provided according to the aspect of configuration.

The pressure sensor 242 can detect whether or not a pressure is applied to the mobile terminal 200, a size of the pressure, and the like. The pressure sensor 242 can be provided at a portion where the detection of a pressure is used in the mobile terminal 200 according to the use environment. When the pressure sensor 242 is provided in the display unit 251, it can be possible to identify a touch input through the display unit 251 and a pressure touch input by which a pressure larger than the touch input is applied according to a signal output from the pressure sensor 242. Furthermore, it can be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis can be used according to the use environment. Accordingly, when an acceleration sensor in the direction of X-axis or Y-axis should be used instead of the direction of Z-axis due to any reason, the acceleration sensor can be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor can detect each rotational angle, i.e., azimuth, pitch and roll, with reference to three directional axes.

The output unit 250 is provided to output visual, auditory, or tactile information. The output unit 250 can include a display unit 251, an audio output module 252, an alarm unit 253, a haptic module 254, and the like.

The display unit 251 can display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 can display images captured and/or received, UI, or GUI.

The display unit 251 can include at least one of a liquid crystal display (LCD), a thin film transistor-liquid crystal display (TFT-LCD), an organic light-emitting diode (OLED), a flexible display, a three-dimensional (3D) display, and the like.

Some of those displays can be configured as a transparent type or an light transmission type through which the outside is visible, which is referred to as a transparent display. A representative example of the transparent display can include a Transparent OLED (TOLED), or the like. The rear surface of the display unit 151 can also be implemented to be optically transparent. Under this configuration, the user can view an object positioned at a rear side of the terminal body through a region occupied by the display unit 251 of the terminal body.

The display unit 251 can be implemented in two or more in number according to a configured aspect of the terminal 200. For instance, a plurality of the display units 251 can be arranged on one surface to be spaced apart from or integrated with each other, or can be arranged on different surfaces.

Here, if the display unit 251 and a touch sensitive sensor (referred to as a touch sensor) have a layered structure therebetween, the display unit 251 can be used as an input device rather than an output device. The touch sensor can be implemented as a touch film, a touch sheet, a touch pad, and the like.

The touch sensor can be configured to convert changes of a pressure applied to a specific part of the display unit 251, or a capacitance occurring from a specific part of the display unit 251, into electric input signals. Also, the touch sensor can be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 can sense which region of the display unit 151 has been touched.

The proximity sensor 241 can be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor can include a transmissive type photoelectric sensor, a direct reflective type photoelectric sensor, a minor reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. The touch screen (touch sensor) can be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns can be output onto the touch screen.

The audio output module 252 can output audio data received from the wireless communication unit 210 or stored in the memory 260, in a call-receiving mode, a call-placing mode, a recording mode, a voice recognition mode, a broadcast reception mode, and so on. The audio output module 252 can output audio signals relating to functions performed in the terminal 200, e.g., sound alarming a call received or a message received, and so on. The audio output module 252 can include a receiver, a speaker, a buzzer, and so on.

The alarm 253 outputs signals notifying the occurrence of an event from the terminal 200. The event occurring from the terminal 100 can include call received, message received, key signal input, touch input, and so on. The alarm 253 can output not only video or audio signals, but also other types of signals such as signals notifying occurrence of events in a vibration manner. Because the video or audio signals can be output through the display unit 251 or the audio output unit 252, the display unit 251 and the audio output module 252 can be categorized into part of the alarm 253.

The haptic module 254 generates various tactile effects which a user can feel. A representative example of the tactile effects generated by the haptic module 254 includes vibration. Vibration generated by the haptic module 254 can have a controllable intensity, a controllable pattern, and so on. For instance, different vibration can be output in a synthesized manner or in a sequential manner.

The haptic module 254 can generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 can be configured to transmit tactile effects through the user's direct contact, or the user's muscular sense using a finger or a hand. The haptic module 254 can be implemented in two or more in number according to the configuration of the terminal 200.

The memory 260 can store a program for the processing and control of the controller 280. Alternatively, the memory 260 can temporarily store input/output data (e.g., phonebook data, messages, still images, video and the like). Also, the memory 260 can store data related to various patterns of vibrations and audio output upon the touch input on the touch screen.

In some embodiments, software components including an operating system, a module performing a wireless communication unit 210 function, a module operating together with the user input unit 230, a module operating together with the A/V input unit 220, a module operating together with the output unit 250 can be stored in the memory 260. The operating system (e.g., LINUX, UNIX, OS X, WINDOWS, Chrome, Symbian, iOS, Android, VxWorks, or other embedded operating systems) can include various software components and/or drivers to control system tasks such as memory management, power management, and the like.

In addition, the memory 260 can store a setup program associated with wireless power transfer or wireless charging. The setup program can be implemented by the controller 280.

Furthermore, the memory 260 can store an application associated with wireless power transfer (or wireless charging) downloaded from an application providing server (for example, an app store). The wireless charging related application is a program for controlling wireless charging transmission, and thus the electronic device 200 can receive power from the wireless power transmitter 100 in a wireless manner or establish connection for data communication with the wireless power transmitter 100 through the relevant program.

The memory 260 can be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 can be operated in association with a web storage performing the storage function of the memory 160 on the Internet.

The interface unit 270 can generally be implemented to interface the portable terminal with all external devices. The interface unit 270 can allow a data reception from an external device, a power delivery to each component in the terminal 200, or a data transmission from the terminal 200 to an external device. The interface unit 270 can include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module can be configured as a chip for storing various information used to authenticate an authority to use the terminal 200, which can include a User Identity Module (UIM), a Subscriber Identity Module (SIM), and the like. Also, the device having the identification module (hereinafter, referred to as "identification device") can be implemented in a type of smart card. Hence, the identification device can be coupled to the terminal 200 via a port.

Also, the interface unit can serve as a path for power to be supplied from an external cradle to the terminal 200 when the terminal 100 is connected to the external cradle or as a path for transferring various command signals input from the cradle by a user to the terminal 200. Such various command signals or power input from the cradle can operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 can include a multimedia module 281 for multimedia playback. The multimedia module 281 can be implemented within the controller 280, or implemented separately from the controller 280.

The controller 280 can perform a pattern recognition processing so as to recognize a writing input or image drawing input carried out on the touch screen as a text or image.

On the other hand, the wireless internet module 213 or the short-range communication module 214 can be in a standby state or disabled to reduce power. After the wireless power signal is received by power receiving unit 291, the controller 280 can determine whether the wireless internet module 213 or the short-range communication module 214 is activated. If the wireless internet module 213 or the short-range communication module 214 is not activated as a result of the determination, then the controller 280 can control to activate the wireless internet module 213 or the short-range communication module 214.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the power receiving control unit 292 within the power supply unit 290 can be implemented to be included in the controller 280, and in the present disclosure, it should be understood that the controller 280 performs the operation by the power receiving control unit 292.

The power supply unit 290 receives internal and external power under the control of the controller 280 to supply power used for the operation of each constituent element.

The power supply unit 290 includes a battery 299 for supplying power to each constituent element of the terminal 200, and the battery 299 can include a charger 298 for performing wired or wireless charging.

The present disclosure discloses a mobile terminal as an example of the apparatus for receiving power in a wireless manner, but it would be easily understood by those skilled in the art that the configuration according to the embodiment disclosed herein can be applicable to a stationary terminal, such as a digital TV, a desktop computer, and the like, excluding when it is applicable to only the mobile terminal.

Figure 11A:
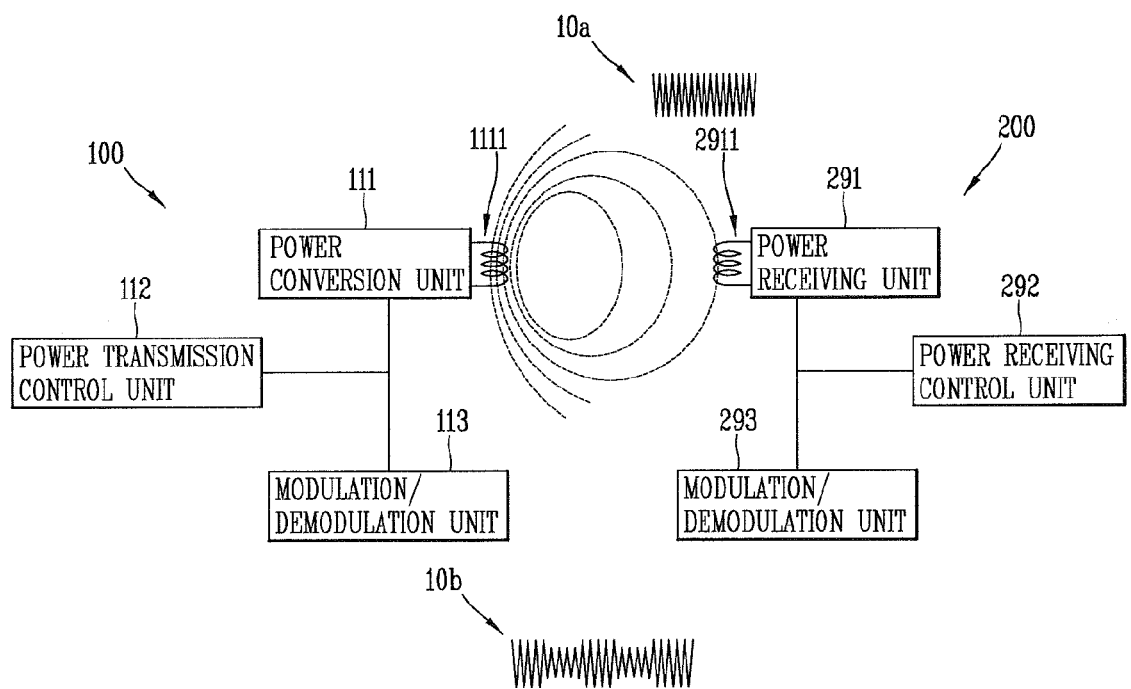
FIGS. 11A and 11B are views illustrating the concept of transmitting and receiving a packet between a wireless power transmitter and an electronic device through the modulation and demodulation of a wireless power signal in transmitting wireless power disclosed herein according to an embodiment of the present invention.
Figure 11B:
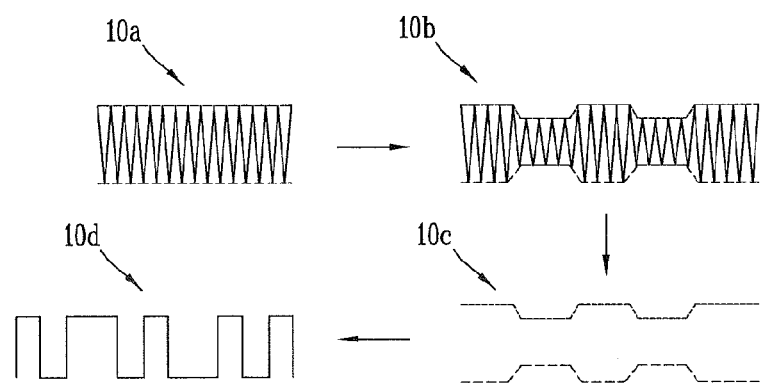

FIGS. 11A and 11B—Backscatter Modulation

FIGS. 11A and 11B are views illustrating the concept of transmitting and receiving a packet between a wireless power transmitter and an electronic device through the modulation and demodulation of a wireless power signal in transmitting wireless power disclosed herein.

Referring to FIG. 11A, the wireless power signal formed by the power conversion unit 111 forms a closed-loop within a magnetic field or electromagnetic field, and therefore, when the electronic device 200 modulates the wireless power signal while receiving the wireless power signal, the wireless power transmitter 100 can detect the modulated wireless power signal. The power communications modulation/demodulation unit 113 can demodulate the detected wireless power signal, and decode the packet from the modulated wireless power signal.

On the other hand, a modulation method used for communication between the wireless power transmitter 100 and the electronic device 200 can be amplitude modulation. As described above, the amplitude modulation method can be a backscatter modulation method in which the power communications modulation/demodulation unit 293 at the side of the electronic device 200 changes an amplitude of the wireless power signal 10a formed by the power conversion unit 111 and the power receiving control unit 292 at the side of the wireless power transmitter 100 detects an amplitude of the modulated wireless power signal 10b.

Specifically, further referring to FIG. 11B, the power receiving control unit 292 at the side of the electronic device 200 modulates the wireless power signal 10a received through the power receiving unit 291 by changing a load impedance within the power communications modulation/demodulation unit 293. The power receiving control unit 292 modulates the wireless power signal 10a to include a packet including a power control message to be transmitted to the wireless power transmitter 100.

Then, the power transmission control unit 112 at the side of the wireless power transmitter 100 demodulates the modulated wireless power signal 10b through an envelope detection process, and decodes the detected signal 10c into digital data 10d. The demodulation process detects a current or voltage flowing into the power conversion unit 111 to be classified into two states, a HI state and a LO state, and acquires a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Figure 12A:
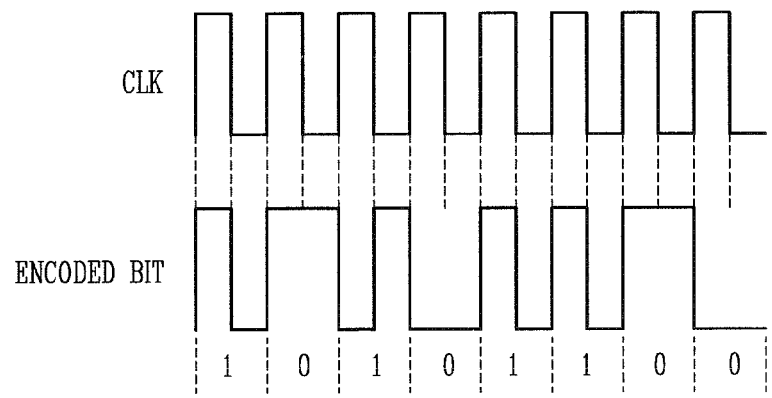
FIGS. 12A and 12B are views illustrating a method of showing data bits and byte constituting a power control message provided by the wireless power transmitter 100 according to an embodiment of the present invention.
Figure 12B:
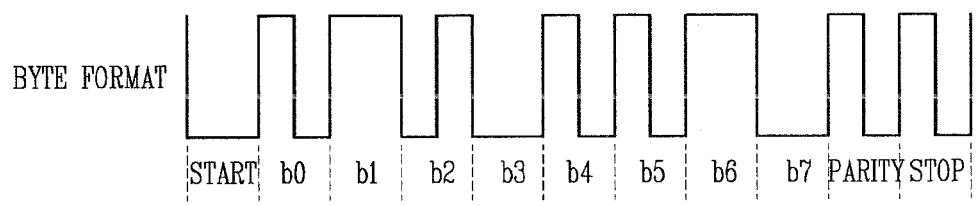

FIGS. 12A and 12B—Bit Encoding, Byte Format

FIGS. 12A and 12B are views illustrating a method of showing data bits and byte constituting a power control message provided by the wireless power transmitter 100.

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device 200. The bit encoding method can correspond to any one of non-return to zero (NRZ) and bi-phase encoding.

For instance, the detected bit can be a differential bi-phase (DBP) encoded bit. According to the DBP encoding, the power receiving control unit 292 at the side of the electronic device 200 is allowed to have two state transitions to encode data bit 1, and to have one state transition to encode data bit 0. In other words, data bit 1 can be encoded in such a manner that a transition between the HI state and LO state is generated at a rising edge and falling edge of the clock signal, and data bit 0 can be encoded in such a manner that a transition between the HI state and LO state is generated at a rising edge of the clock signal.

On the other hand, the power transmission control unit 112 can acquire data in a byte unit using a byte format constituting a packet from a bit string detected according to the bit encoding method. For instance, the detected bit string can be transferred by using a 11-bit asynchronous serial format as illustrated in FIG. 12B. In other words, the detected bit can include a start bit indicating the beginning of a byte and a stop bit indicating the end of a byte, and also include data bits (b0 to b7) between the start bit and the stop bit. Furthermore, it can further include a parity bit for checking an error of data. The data in a byte unit constitutes a packet including a power control message.

Figure 13:
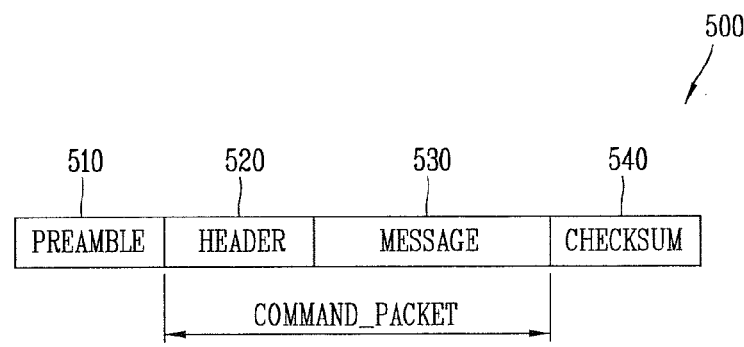
FIG. 13 is a view illustrating a packet including a power control message used in a contactless power transfer method according to the embodiments disclosed herein.

FIG. 13—Packet Format

FIG. 13 is a view illustrating a packet including a power control message used in a wireless power transfer method according to the embodiments disclosed herein.

The packet 500 can include a preamble 510, a header 520, a message 530, and a checksum 540.

The preamble 510 can be used to perform synchronization with data received by the wireless power transmitter 100 and detect the start bit of the header 520. The preamble 510 can be configured to repeat the same bit. For instance, the preamble 510 can be configured such that data bit 1 according to the DBP encoding is repeated eleven to twenty five times.

The header 520 can be used to indicate a type of the packet 500. A size of the message 530 and the kind thereof can be determined based on a value indicated by the header 520. The header 520 is a value having a predetermined size to be positioned subsequent to the preamble 510. For instance, the header 520 can be a byte in size.

The message 530 can be configured to include data determined based on the header 520. The message 530 has a predetermined size according to the kind thereof.

The checksum 540 can be used to detect an error that can be occurred in the header 520 and the message 530 while transmitting a power control message. The header 520 and the message 530 excluding the preamble 510 for synchronization and the checksum 540 for error checking can be referred to as command-packet.

Figure 14:
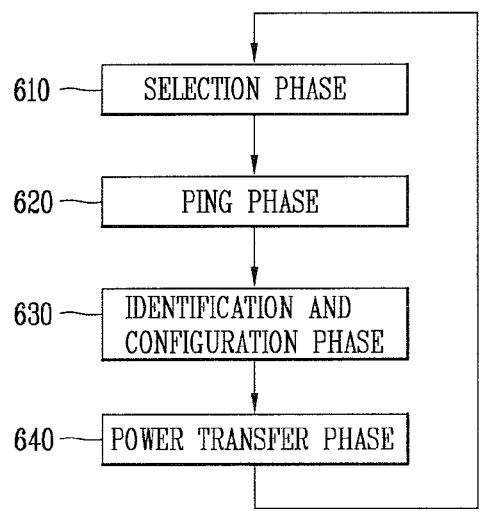
FIG. 14 is a view illustrating the operation phases of the wireless power transmitter 100 and electronic device 200 according to the embodiments disclosed herein.

FIG. 14—Operation Phases

FIG. 14 is a view illustrating the operation phases of the wireless power transmitter 100 and electronic device 200 according to the embodiments disclosed herein.

FIG. 14 illustrates the operation phases of the wireless power transmitter 100 and electronic device 200 according to the embodiments disclosed herein. Furthermore, FIGS. 15 through 20 illustrate the structure of packets including a power control message between the wireless power transmitter 100 and electronic device 200.

Referring to FIG. 14, the operation phases of the wireless power transmitter 100 and the electronic device 200 for wireless power transfer can be divided into a selection state 610, a ping state 620, an identification and configuration state 630, and a power transfer state 640.

The wireless power transmitter 100 detects whether or not objects exist within a range that the wireless power transmitter 100 can transmit power in a wireless manner in the selection state 610, and the wireless power transmitter 100 sends a detection signal to the detected object and the electronic device 200 sends a response to the detection signal in the ping state 620.

Furthermore, the wireless power transmitter 100 identifies the electronic device 200 selected through the previous states and acquires configuration information for power transfer in the identification and configuration state 630. The wireless power transmitter 100 transmits power to the electronic device 200 while controlling power transmitted in response to a control message received from the electronic device 200 in the power transfer state 640.

Hereinafter, each of the operation phases will be described in detail.

1) Selection State

The wireless power transmitter 100 in the selection state 610 performs a detection process to select the electronic device 200 existing in a semi-active area or in a semi-charging area. The semi-active area, as described above, refers to a region in which an object within the relevant area can affect on the characteristic of the power of the power conversion unit 111. Compared to the ping state 620, the detection process for selecting the electronic device 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the electronic device 200 using a power control message. The detection process in the selection state 610 can be referred to as an analog ping process in the aspect of detecting an object using a wireless power signal without using a packet in a digital format in the ping state 620 which will be described later.

The wireless power transmitter 100 in the selection state 610 can detect that an object comes in or out within the semi-active area. Furthermore, the wireless power transmitter 100 can distinguish the electronic device 200 capable of transferring power in a wireless manner from other objects (for example, a key, a coin, etc.) among objects located within the semi-active area.

As described above, a distance that can transmit power in a wireless manner can be different according to the inductive coupling method and resonance coupling method, and thus the semi-active area for detecting an object in the selection state 610 can be different from one another.

First, when power is transmitted according to the inductive coupling method, the wireless power transmitter 100 in the selection state 610 can monitor an interface surface to detect the alignment and removal of objects.

Furthermore, the wireless power transmitter 100 can detect the location of the electronic device 200 placed on an upper portion of the interface surface. As described above, the wireless power transmitter 100 formed to include one or more transmitting coils can perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 can determine which coil to be used for wireless power transfer based on the detected location of the electronic device 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the semi-active area.

On the other hand, the wireless power transmitter 100 in the selection state 610 can detect an object by at least any one of the detection methods using the inductive coupling method and resonance coupling method. The wireless power transmitter 100 can perform an object detection process according to each power transmission method, and subsequently select a method of detecting the object from the coupling methods for wireless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 can have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the electronic device 200 existing within the semi-active area through a power control message. The electronic device 200 placed existing in the semi-active area can exchange a power control message with the wireless power transmitter 100. Compared to the detection process of the electronic device 200 in the semi-active area using a characteristic of the wireless power signal and the like in the selection state 610, the detection process based on exchanging the power control message in the ping state 620 can be referred to as a digital ping process.

The wireless power transmitter 100 in the ping state 620 forms a wireless power signal to detect the electronic device 200, demodulates the wireless power signal modulated by the electronic device 200, and acquires a power control message in a digital data format corresponding to a response to the detection signal from the modulated wireless power signal. The wireless power transmitter 100 can receive a power control message corresponding to the response to the detection signal to recognize the electronic device 200 which is a subject of power transmission.

The detection signal allows the wireless power transmitter 100 in the ping state 620 to perform a digital detection process can be a wireless power signal formed by applying a power signal at a specific operating point for a predetermined period of time. The operating point can denote a frequency, duty cycle, and amplitude of the voltage applied to the transmitting (Tx) coil. The wireless power transmitter 100 can generate the detection signal generated by applying the power signal at a specific operating point for a predetermined period of time, and attempt to receive a power control message from the electronic device 200.

Figure 15:
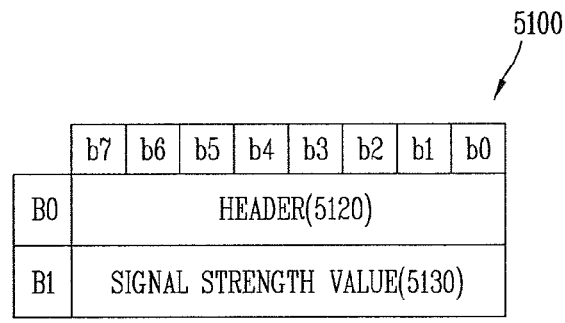

On the other hand, the power control message corresponding to a response to the detection signal can be a message indicating a strength of the wireless power signal received by the electronic device 200. For example, the electronic device 200 can transmit a signal strength packet 5100 including a message indicating the received strength of the wireless power signal as a response to the detection signal as illustrated in FIG. 15. The packet 5100 can include a header 5120 for notifying a packet indicating the signal strength and a message 5130 indicating a strength of the power signal received by the electronic device 200. The strength of the power signal within the message 5130 can be a value indicating a degree of inductive coupling or resonance coupling for power transmission between the wireless power transmitter 100 and the electronic device 200.

The wireless power transmitter 100 can receive a response message to the detection signal to find the electronic device 200, and then extend the digital detection process to enter the identification and configuration state 630. In other words, the wireless power transmitter 100 maintains the power signal at a specific operating point subsequent to finding the electronic device 200 to receive a power control message used in the identification and configuration state 630.

However, if the wireless power transmitter 100 is not able to find the electronic device 200 to which power can be transferred, then the operation phase of the wireless power transmitter 100 will be returned to the selection state 610.

3) Identification and Configuration State

The wireless power transmitter 100 in the identification and configuration state 630 can receive identification information and/or configuration information transmitted by the electronic device 200, thereby controlling power transfer to be effectively carried out.

The electronic device 200 in the identification and configuration state 630, which is placed in the semi-active area, can transmit a power control message including its own identification information. For this purpose, the electronic device 200, for instance, can transmit an identification packet 5200 including a message indicating the identification information of the electronic device 200 as illustrated in FIG. 16A. The packet 5200 can include a header 5220 for notifying a packet indicating identification information and a message 5230 including the identification information of the electronic device. The message 5230 can include information (2531 and 5232) indicating a version of the contract for wireless power transfer, information 5233 for identifying a manufacturer of the electronic device 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 can include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the electronic device 200.

Figure 17:
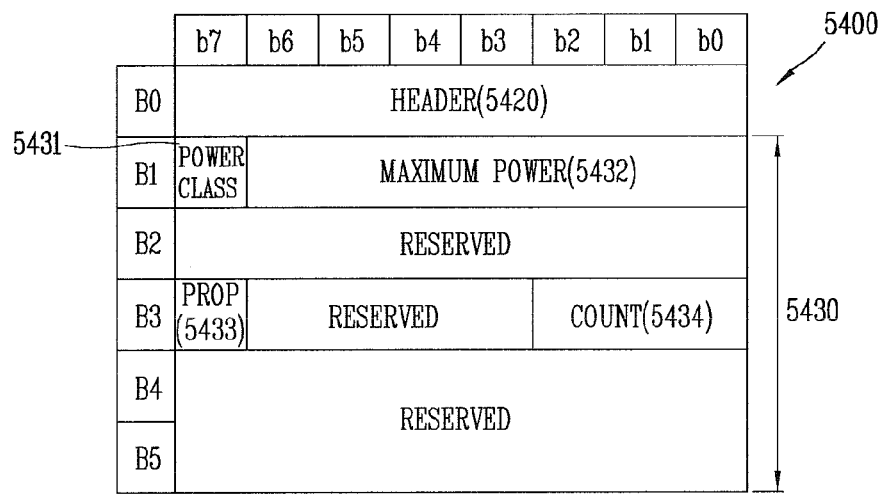

The electronic device 200 can transmit a power control message including information on expected maximum power in the identification and configuration state 630. To this end, the electronic device 200, for instance, can transmit a configuration packet 5400 as illustrated in FIG. 17. The packet can include a header 5420 for notifying that it is a configuration packet and a message 5430 including information on the expected maximum power. The message 5430 can include power class 5431, information 5432 on expected maximum power, an indicator 5433 indicating a method of determining a current of a main cell at the side of the wireless power transmitter, and the number 5434 of optional configuration packets. The indicator 5433 can indicate whether or not a current of the main cell at the side of the wireless power transmitter is determined as specified in the contract for wireless power transfer.

On the other hand, the wireless power transmitter 100 can generate a power transfer contract which is used for power charging with the electronic device 200 based on the identification information and/or configuration information. The power transfer contract can include the limits of parameters determining a power transfer characteristic in the power transfer state 640.

The wireless power transmitter 100 can terminate the identification and configuration state 630 and return to the selection state 610 prior to entering the power transfer state 640. For instance, the wireless power transmitter 100 can terminate the identification and configuration state 630 to find another electronic device that can receive power in a wireless manner.

Figure 18:
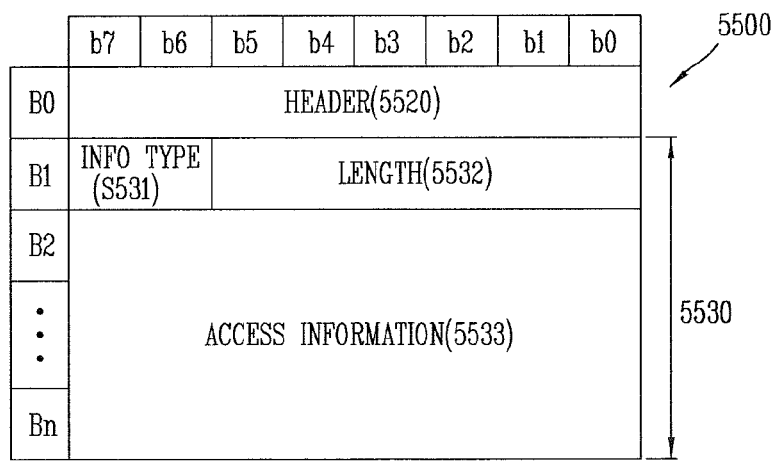

On the other hand, the electronic device 200 can transmit a power control message including the access information of the wireless internet module 213 or short-range communication module 214 in FIG. 10. For this purpose, the electronic device 200, for instance, can transmit a connection configuration packet 5500 as illustrated in FIG. 18. The packet can include a header 5520 for notifying that it is a connection packet and a message 5530 including information on the access information. The message 5530 can include a field 5531 indicating a kind of the access information, a field 5532 indicating a length of the access information, and access information 5533. The field indicating a kind of the access information can be provided to identify a communication method of the wireless internet module 213 or the short-range communication module 214 and a kind of authentication/authorization information.

4) Power Transfer State

The wireless power transmitter 100 in the power transfer state 640 transmits power to the electronic device 200.

Figure 19:
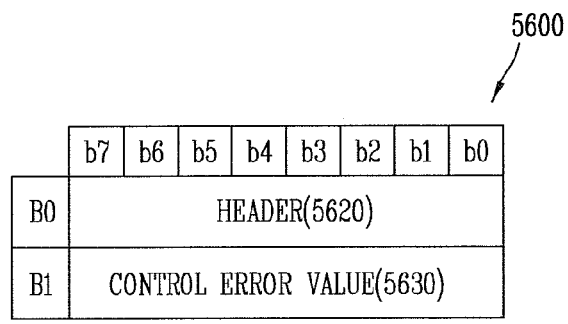

The wireless power transmitter 100 can receive a power control message from the electronic device 200 while transmitting power, and control a characteristic of the power applied to the transmitting coil in response to the received power control message. For example, the power control message used to control a characteristic of the power applied to the transmitting coil can be included in a control error packet 5600 as illustrated in FIG. 19. The packet 5600 can include a header 5620 for notifying that it is a control error packet and a message 5630 including a control error value. The wireless power transmitter 100 can control the power applied to the transmitting coil according to the control error value. In other words, a current applied to the transmitting coil can be controlled so as to be maintained if the control error value is "0", reduced if the control error value is a negative value, and increased if the control error value is a positive value.

The wireless power transmitter 100 can monitor parameters within a power transfer contract generated based on the identification information and/or configuration information in the power transfer state 640. As a result of monitoring the parameters, if power transmission to the electronic device 200 violates the limits included in the power transfer contract, then the wireless power transmitter 100 can cancel the power transmission and return to the selection state 610.

The wireless power transmitter 100 can terminate the power transfer state 640 based on a power control message transferred from the electronic device 200.

For example, if the charging of a battery has been completed while charging the battery using power transferred by the electronic device 200, then a power control message for requesting the suspension of wireless power transfer will be transferred to the wireless power transmitter 100. The wireless power transmitter 100 can receive a message for requesting the suspension of the power transmission, and then terminate wireless power transfer, and return to the selection state 610.

For another example, the electronic device 200 can transfer a power control message for requesting renegotiation or reconfiguration to update the previously generated power transfer contract. The electronic device 200 can transfer a message for requesting the renegotiation of the power transfer contract when a larger or smaller amount of power than the currently transmitted power amount is needed. The wireless power transmitter 100 can receive a message for requesting the renegotiation of the power transfer contract, and then terminate wireless power transfer, and return to the identification and configuration state 630.

Figure 20:
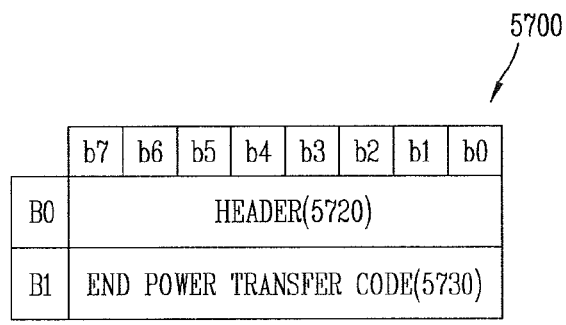

To this end, a message transmitted by the electronic device 200, for instance, can be an end power transfer packet 5700 as illustrated in FIG. 20. The packet 5700 can include a header 5720 for notifying that it is an end power transfer packet and a message 5730 including an end power transfer code indicating the cause of the suspension. The end power transfer code can indicate any one of charge complete, internal fault, over temperature, over voltage, over current, battery failure, reconfigure, no response, and unknown error.

Figure 21:
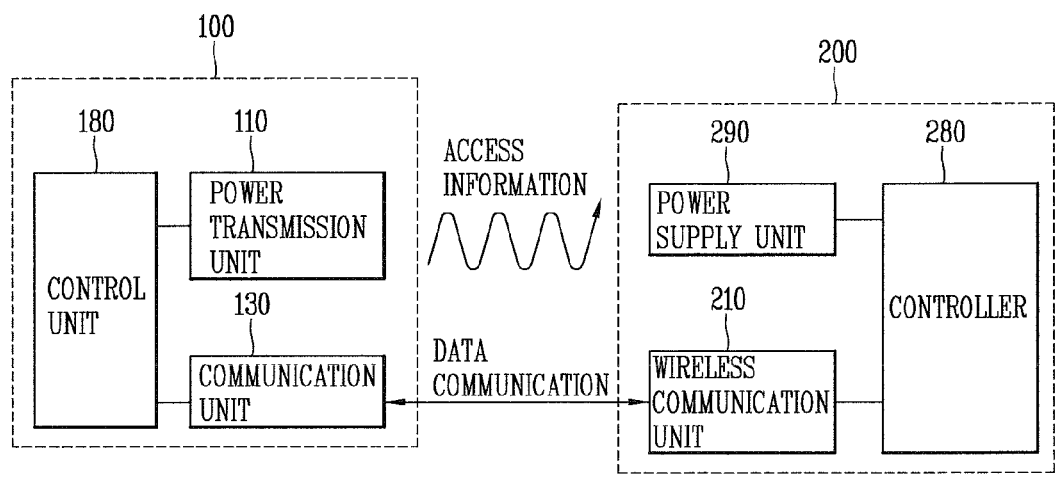
FIG. 21 is a conceptual view illustrating a method of establishing communication connection between the wireless power transmitter and electronic device according to the embodiments disclosed herein.

FIG. 21—Conceptual View

Hereinafter, a method of allowing the wireless power transmitter and electronic device according to the embodiments disclosed herein to establish connection for data communication using a wireless power signal will be described.

FIG. 21 is a conceptual view illustrating a method of establishing communication connection between the wireless power transmitter and electronic device according to the embodiments disclosed herein.

Referring to FIG. 21, the wireless power transmitter 100 and electronic device 200 according to the embodiments disclosed herein can establish connection to transmit and receive user data between each communication unit 130, 120 and transmit and receive data through the connection. However, access information used to establish the connection can be transferred through a wireless power signal between the power transmission unit 110 and the power supply unit 290.

Such a connection establishment process will be described in detail with reference to FIGS. 22 and 23.

FIG. 22—Flow Chart

Figure 22:
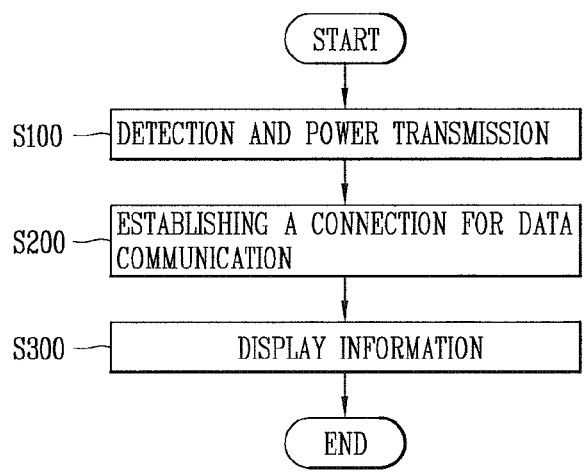
FIGS. 22 and 23 are flow charts illustrating a method of establishing communication connection between the wireless power transmitter and electronic device according to the embodiments disclosed herein.
Figure 23:
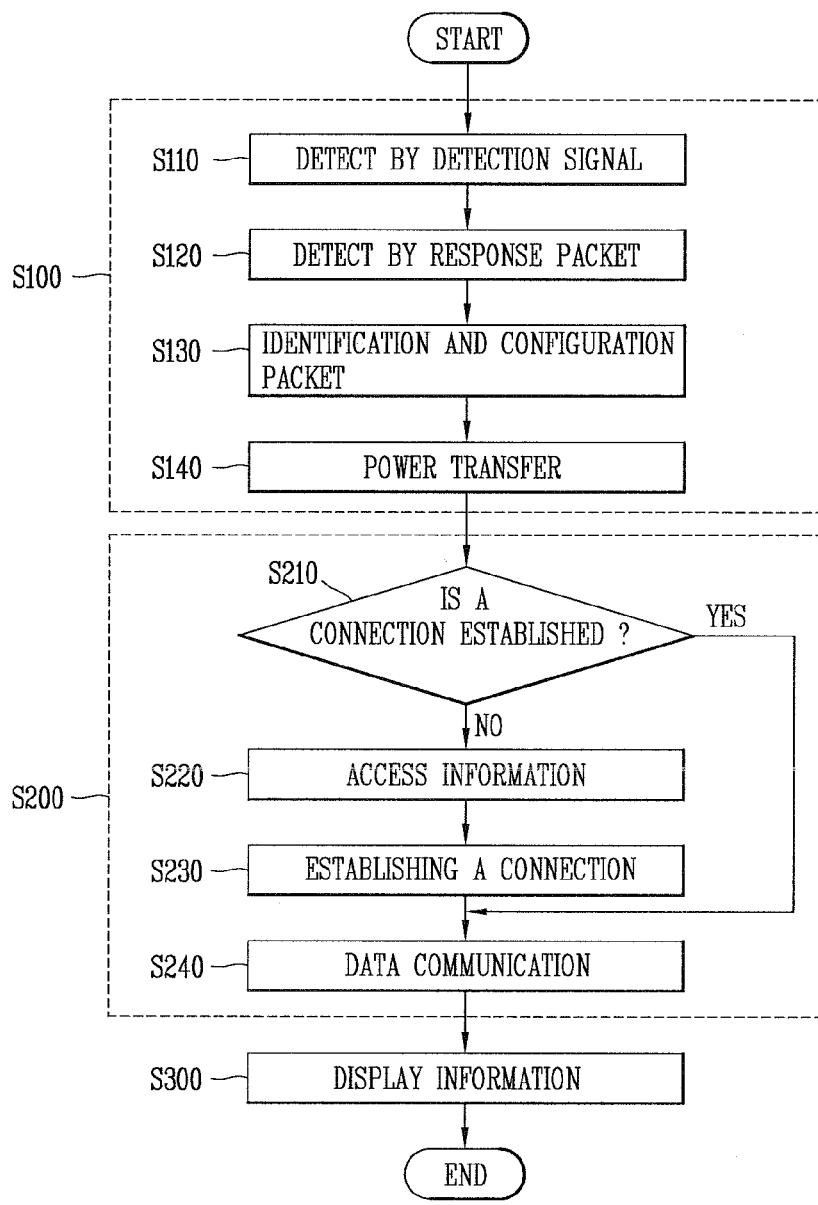

FIGS. 22 and 23 are flow charts illustrating a method of establishing communication connection between the wireless power transmitter and electronic device according to the embodiments disclosed herein.

First, referring to FIG. 22, the method of allowing the wireless power transmitter 100 to transfer power to the electronic device 200 in a wireless manner, and allowing the electronic device 200 to provide access information to the wireless power transmitter 100, thereby establishing connection for communication, will be described in brief.

Specifically, the wireless power transmitter 100 detects the electronic device 200 using a wireless power signal, and transmits power to the detected electronic device 200 in accordance with the wireless coupling method (S100). Next, the wireless power transmitter 100 establishes connection for data communication with the electronic device 200 (S200). In order to establish the connection, the electronic device 200 can modulate a wireless power signal to include access information, and the wireless power transmitter can receive the access information through the modulated wireless power signal. The wireless power transmitter 100 and the electronic device 200 can establish the connection for mutual data communication based on the access information. The step (S200) of establishing the connection can be implemented while performing the step (S100) of the detection and power transmission. The wireless power transmitter 100 and the electronic device 200 can display information on the power transmission or information on a communication state using the established connection (S300).

FIG. 23—Detailed Flow Chart

Referring to FIG. 23, the method of establishing communication connection between the wireless power transmitter 100 and electronic device 200 according to the embodiments disclosed herein will be described in more detail.

First, the step (S100) of performing detection and power transmission will be described.

The wireless power transmitter 100 detects the electronic device 200 using a wireless power signal. The detection process will be carried out according to at least any one of several methods (S110 to S130) which will be described later.

In the selection state 610, the wireless power transmitter 100 can detect the electronic device 200 by measuring a change of supplied power to form the wireless power signal and determining the presence or absence of the electronic device 200 based on the measured change amount of the power (S110). In other words, the wireless power transmitter 100 can detect the electronic device 200 by performing an analog detection process in the selection state 610.

Furthermore, in the ping state 620, the wireless power transmitter 100 can detect the electronic device 200 by forming a detection signal through the power conversion unit 111, and receiving a packet in response to the detection signal (S120). In other words, the wireless power transmitter 100 can detect the electronic device 200 by performing a digital detection process in the ping state 620. Here, the detection signal is a wireless power signal that is formed by applying a power signal at a specific operating point to the power conversion unit 111. The electronic device 200 can transmit a strength of the detection signal received by the electronic device 200 to the wireless power transmitter 100 in response to the detection signal through the modulated wireless power signal. The strength of the detection signal can be transmitted in the form of a signal strength packet 5100.

Similarly, in the identification and configuration state 630, the electronic device 200 can transmit its own identification information to the wireless power transmitter 100 through the modulated wireless power signal. The identification information can be transmitted in the form of an identification packet 5200. The wireless power transmitter 100 can detect the presence of the electronic device 200 by receiving the identification information in the form of a packet (S130).

Subsequent to detecting the electronic device 200, the wireless power transmitter 100 can identify the electronic device 200 or acquire configuration information for power transfer to configure the characteristic of power, and then transmit power to the electronic device 200 (S140). The electronic device 200 can perform charging using the transferred power.

Then, the wireless power transmitter 100 and the electronic device 200 examine the step (S200) of establishing connection for data communication.

If the electronic device 200 is detected prior to establishing the connection, then the wireless power transmitter 100 can determine whether its own communication module for establishing connection for data communication with the detected electronic device 200 is activated, and control the communication module to be activated if the communication module is not activated as a result of the determination.

Similarly, the electronic device 200 can also determine whether or not the communication module mounted on the electronic device 200 is activated subsequent to receiving a wireless power signal formed by the wireless power transmitter 100, and control the communication module to be activated if the communication module is not activated as a result of the determination.

The wireless power transmitter 100 can determine whether or not connection to the electronic device 200 is established (S210). The wireless power transmitter 100 can request access information for establishing the connection to the electronic device 200 if the connection is not established as a result of the determination. The wireless power transmitter 100 can request the access information through a wireless power signal as described above.

Then, the electronic device 200 received a request for the access information generates a packet including access information for connection to the wireless power transmitter 100, and transmits the packet to the wireless power transmitter 100 through the modulated wireless power signal (S220). The packet including the access information can be a connection configuration packet or configuration packet.

On the other hand, as a modified example of the embodiment, the electronic device 200 can first transmit a packet including the access information to the wireless power transmitter 100 without receiving an access information request.

Then, the wireless power transmitter 100 and the electronic device 200 establish connection for data communication based on the access information (S230). The process (S230) for establishing the connection can perform pairing between devices, or perform the authentication of a device being performed or user prior to data communication.

Next, the wireless power transmitter 100 and the electronic device 200 can transmit and receive data through the established connection (S240).

The data transmitted and received through the connection can be information on power transmission or information on a communication state using the established connection.

On the other hand, the wireless power transmitter 100 can display information on whether or not the electronic device 200 has been detected, a connection state, a data transmitting and receiving state for data communication with the electronic device 200, or power transferred to the electronic device 200 on the display unit. The information on power includes a rectified power amount, a power transfer speed, a power transfer efficiency, a power transfer time, a charge progress rate, a charged power amount or power transfer state in the electronic device 200.

Similarly, the electronic device 200 can display information on a receiving state of the wireless power signal, a connection state for data communication, a data transmitting and receiving state, or received power on the display unit. The information on received power includes a rectified power amount, a power transfer speed, a power transfer efficiency, a power transfer time, a charge progress rate, a charged power amount or a power transfer state by the power receiving unit.

The foregoing method can be implemented in a recording medium readable by a computer or its similar devices by employing, for example, software, hardware or some combinations thereof.

For a hardware implementation, the embodiments described herein can be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods can be implemented by the control unit 180 or power transmission control unit 112 in the wireless power transmitter 100, or implemented by the controller 280 or power receiving control unit 292 in the electronic device 200.

For a software implementation, the embodiments such as procedures and functions disclosed herein can be implemented with separate software modules. Each of the software modules can perform one or more of the functions and operations described herein. Software codes can be implemented by using a software application written in a suitable programming language. The software codes can be stored in the memory 150 in the wireless power transmitter 100, and implemented by the control unit 180 or the power transmission control unit 112, and similarly, stored in the memory 260 in the electronic device 200, and implemented by the controller 280 or the power receiving control unit 292.

The scope of the invention will not be limited to the embodiments disclosed herein, and thus various modifications, variations, and improvements can be made in the present invention without departing from the technical idea of the invention, and within the scope of the appended claims.

What is claimed is:
1. A power transmitter, comprising:
a power transmission unit including a transmission coil;
a communication unit including an antenna; and
a control processor configured to:
transmit a wireless power signal including access information along a first communication channel using the transmission coil, detect a power receiver using the transmitted wireless power signal, receive a modulated connection configuration packet included in a modulated wireless power signal received from the power receiver along the first communication channel, decode the modulated connection configuration packet, wherein the modulated connection configuration packet includes access information, and establish a second communication channel based on the access information so the control processor transceives data between the power transmitter and the power receiver through the second communication channel.

2. The power transmitter of claim 1, wherein the control processor is configured to acquire the access information from the modulated connection configuration packet when a connection between the power transmitter and the power receiver is not established.

3. The power transmitter of claim 1, wherein the control processor is further configured to request the access information from the power receiver when a connection between the power transmitter and the power receiver is not established.

4. The power transmitter of claim 3, wherein the access information is requested through the wireless power signal.

5. The power transmitter of claim 1, wherein the control processor is further configured to detect the power receiver by measuring an amount of power supplied to generate the wireless power signal and determine whether or not the power receiver exists based on a change in the amount of the power measured.

6. The power transmitter of claim 1, wherein the control processor is further configured to detect the power receiver by generating a detection signal and receive the connection configuration packet in response to the detection signal.

7. The power transmitter of claim 6, wherein the detection signal is the wireless power signal generated by applying a power signal at a specific operating point.

8. The power transmitter of claim 6, wherein the modulated connection configuration packet received in response to the detection signal includes a message indicating a strength of the detection signal received by the power receiver.

9. The power transmitter of claim 1, wherein the control processor is further configured to determine whether or not the communication unit is activated if the power receiver is detected, and activate the communication unit when the communication unit is not activated.

10. The power transmitter of claim 1, further comprising:
a display configured to display information on power transferred to the power receiver including at least one of an amount of rectified power, a power transfer speed, a power transfer efficiency, a total time of power transfer, a progress of charging, an amount of charged power or information on a power transfer state in the power receiver.

11. A power receiver, comprising:
a power receiving unit including a receiving coil and configured to receive a wireless power signal from a power transmitter along a first communication channel;
a communication unit including an antenna; and
a control processor configured to:
modulate a connection configuration packet using the wireless power signal via the power receiving unit, wherein the connection configuration packet includes access information for connecting to the power transmitter,
transmit the modulated connection configuration packet to the power transmitter through the first communication channel, and
establish a second communication channel based on the access information so the control processor transceives data between the power transmitter and the power receiver through the second communication channel.

12. The power receiver of claim 11, wherein the control processor is further configured to transmit the modulated connection configuration packet to the power transmitter when a connection between the power transmitter and the power receive is not established.

13. The power receiver of claim 11, wherein the control processor is further configured to transmit the modulated connection configuration packet to the power transmitter when the access information is requested from the power transmitter.

14. The power receiver of claim 13, wherein the access information is requested along the first communication channel.

15. The power receiver of claim 11, wherein the access information is related to authentication or authorization for the data communication along the second communication channel.

16. The power receiver of claim 11, wherein the second communication channel is a Bluetooth channel, and the access information includes a password or address.

17. The power receiver of claim 16, wherein the control processor is further configured to establish the second communication channel by performing device pairing with the power transmitter based on a Bluetooth address.

18. The power receiver of claim 11, wherein the first communication channel is a wireless LAN communication channel, and the access information includes a password, a key or an address used to access the wireless LAN.

19. The power receiver of claim 18, wherein the control processor is further configured to establish the second communication channel by performing authentication with the power transmitter based on the access information.

20. The power receiver of claim 11, wherein the control processor is further configured to transmit the modulated connection configuration packet in response to a wireless power signal for detection to the power transmitter when receiving the wireless power signal for detection by the power receiving unit.

21. The power receiver of claim 20, wherein the modulated connection configuration packet transmitted in response to the wireless signal for detection includes a message indicating a strength of the wireless power signal for detection received by the power receiving unit.

22. The power receiver of claim 11, wherein the control processor is further configured to determine whether or not the communication unit is activated if the wireless power signal is received by the power receiving unit, and activates the communication unit when the communication unit is not activated.

23. The power receiver of claim 11, further comprising:
a display configured to display information on power transferred to the power receiver including at least one of an amount of rectified power, a power transfer speed, a power transfer efficiency, a total time of power transfer, a progress of charging, an amount of charged power or a power transfer state by the power receiving unit.

* * * * *